United States Patent
Choi et al.

(10) Patent No.: US 12,539,325 B2
(45) Date of Patent: *Feb. 3, 2026

(54) EXOSOMES FOR TARGET SPECIFIC DELIVERY AND METHODS FOR PREPARING AND DELIVERING THE SAME

(71) Applicants: ILIAS BIOLOGICS INC., Daejeon (KR); ILIAS THERAPEUTICS, INC., New York, NY (US)

(72) Inventors: Chulhee Choi, Daejeon (KR); Nambin Yim, Daejeon (KR); Hojun Choi, Daejeon (KR); Kyungsun Choi, Daejeon (KR); Seung-Wook Ryu, Daejeon (KR)

(73) Assignees: ILIAS BIOLOGICS INC., Daejeon (KR); ILIAS THERAPEUTICS, INC.

( * ) Notice: Subject to any disclaimer, the term of this patent is extended or adjusted under 35 U.S.C. 154(b) by 0 days.

This patent is subject to a terminal disclaimer.

(21) Appl. No.: 18/887,997

(22) Filed: Sep. 17, 2024

(65) Prior Publication Data

US 2025/0009845 A1    Jan. 9, 2025

Related U.S. Application Data

(63) Continuation of application No. 18/412,403, filed on Jan. 12, 2024, now Pat. No. 12,133,879, which is a continuation of application No. 16/887,029, filed on May 29, 2020, now Pat. No. 11,872,193, and a continuation-in-part of application No. 16/639,740, filed as application No. PCT/IB2018/056200 on Aug. 16, 2018, now abandoned.

(60) Provisional application No. 62/659,816, filed on Apr. 19, 2018.

(30) Foreign Application Priority Data

Aug. 17, 2017   (KR) .................. 10-2017-0104171

(51) Int. Cl.
| | | |
|---|---|---|
| A61K 47/69 | (2017.01) | |
| A61K 38/00 | (2006.01) | |
| A61K 38/17 | (2006.01) | |
| C07K 14/705 | (2006.01) | |
| C07K 16/18 | (2006.01) | |
| C07K 16/28 | (2006.01) | |
| C12N 15/62 | (2006.01) | |
| C12N 15/85 | (2006.01) | |
| C12P 21/02 | (2006.01) | |

(52) U.S. Cl.
CPC ........ *A61K 38/177* (2013.01); *A61K 47/6917* (2017.08); *C07K 14/705* (2013.01); *C07K 14/70596* (2013.01); *C07K 16/18* (2013.01); *C07K 16/28* (2013.01); *C12N 15/62* (2013.01); *C12N 15/85* (2013.01); *C12P 21/02* (2013.01); *A61K 38/00* (2013.01); *C07K 2317/80* (2013.01); *C07K 2319/03* (2013.01); *C07K 2319/70* (2013.01)

(58) Field of Classification Search
None
See application file for complete search history.

*Primary Examiner* — Daniel C Gamett
(74) *Attorney, Agent, or Firm* — Morgan, Lewis & Bockius LLP

(57) ABSTRACT

The present invention provides a method for producing an exosome that transfers an active substance specifically to a target and the exosome produced by the same; a method for delivering the active substance to the target tissue using the exosome; a pharmaceutical composition for delivery of the active substance comprising the exosome as an active ingredient; and a composition for preparing the exosome comprising an expression vector wherein the target peptide is inserted into an extracellular portion of a transmembrane protein.

20 Claims, 6 Drawing Sheets
Specification includes a Sequence Listing.

EXOSOMES FOR TARGET SPECIFIC DELIVERY AND METHODS FOR PREPARING AND DELIVERING THE SAME

CROSS REFERENCE TO RELATED APPLICATIONS

This application claims benefit from Korean Patent Application No. 10-2017-0104171 filed Aug. 17, 2017, and U.S. Provisional Application No. 62/659,816 filed Apr. 19, 2018, the contents of each of which are incorporated herein by reference.

SEQUENCE LISTING SUBMISSION VIA PATENT CENTER

A computer readable xml file, entitled "128742-5001-US-02_Sequence Listing_ST26.xml," created on or about Mar. 12, 2024, with a file size of 109,707 bytes contains the sequence listing for this application and is hereby incorporated by reference in its entirety.

FIELD OF THE INVENTION

The present invention relates to a method for preparing an exosome that delivers a substance in a target specific manner and an exosome prepared by the method.

BACKGROUND OF THE INVENTION

The human body is composed of about 200 kinds of 100 trillion cells, in which the physiological activity is regulated by the action of various proteins to maintain life.

Cells are surrounded by membranes in bilayer structure composed of phospholipids, which block the entry of foreign substances into cells. Most of the protein drugs which have developed so far cannot pass through the cell membrane to enter the cell and can act on the outside of the cell or act on a receptor on the cell membrane to deliver the signal into the cell in order to show physiological effect.

Cytosol has lots of proteins which interact with each other to regulate physiological activity. So, if only a protein drug can be delivered inside the cell, that is, inside the cytosol, the cell activity would be controlled more effectively.

Recently, studies have been actively going on to establish a method for delivering a target protein directly into cells via cell membrane. When a recombinant protein of a target protein and protein transduction domains (PTDs), the peptide that passes through the cell membrane, is prepared and administered, it can enter the cytosol through the cell membrane. PTD is exemplified by HIV-1 TAT, HSV VP22, Antp, dfTAT, and Hph-1. A fusion protein prepared by combining the PTDs and a target protein is produced as a recombinant protein and at this time a separation process is required. However, this process is problematic in that the protein refolding is not performed properly, the activity is decreased, the protein is nonspecifically transferred, the risk of causing an immune reaction in vivo is large, the cost is high, and the yield is low.

On the other hand, a target protein combined with various nanoparticles such as Gold NP (nano particle), Liposome NP, Magnetic NP, and Polymeric NP can enter the cytoplasm through the cell membrane by endocytosis. However, most of the complexes of nanoparticles and target proteins are degraded in lysosomes in cells. If the target protein is degraded inside the lysosome, the activity of the protein is lost. Furthermore, it is difficult to separate the target protein and the nanoparticles in the cytoplasm, and the toxicity of the nanoparticles may be a problem as well.

Exosome is a small vesicle with a membrane structure in the size of 50~200 nm, which is secreted out of the cell with containing protein, DNA, and RNA for intercellular signaling.

Exosome was first found in the process of leaving only hemoglobin in the red blood cells by eliminating intracellular proteins at the last stage of red cell maturation. From the observation under electron microscope, it was confirmed that exosome is not separated directly from plasma membrane but discharged extracellular from the intracellular specific zone, called multivesicular bodies (MVBs). That is, when MVBs are fused with plasma membrane, such vesicles are discharged outside of the cell, which are called exosome.

It has not been clearly disclosed the molecular mechanism of the exosome generation. However, it is known that various immune cells including B-lymphocytes, T-lymphocytes, dendritic cells, megakaryocytes, and macrophages, stem cells, and tumor cells produce and secrete exosomes when they are alive.

Exosome contains various intracellular proteins, DNA, and RNA. These substances contained in the exosome secreted out of the cell and can be reintroduced into other cells by fusion or endocytosis and serve as intercellular messengers.

Exosomes with the desired protein inside can be used to treat various diseases in vivo. This requires efficient production of exosomes containing target proteins. Korean Patent Registration No. 10-0519384 discloses a method comprising:

1) the introduction of a gene for a specific antigen into a cell line;
2) stable expression of the protein produced from the introduced gene in the cell line; and
3) releasing it out of the cell through the exosome, and a method of using the produced exosome as a vaccine.

However, since the exosome is formed naturally in cells, even when a gene encoding a target protein is introduced into the production cells, the possibility of preparing the exosome containing the target protein is very low. There is a problem that the delivery efficiency of the exosome to the target tissue is low.

The tetraspanin family has four transmembrane domains, intracellular N- and C-termini and two extracellular loops protrude between the first and second, and third and fourth transmembrane domains.

CD9 is a 24-27 kD sized cell surface glycoprotein receptor belonging to the tetraspanin family, which regulates signal transduction actions important for regulating cell development, activity, growth and motility. In addition, it can regulate cell adhesion and cell migration and induces platelet activation involved in platelet-induced endothelial cell proliferation. In addition, it promotes muscle cell fusion and contributes to the maintenance of root canal.

The present invention provides a method for producing an exosome for target specific delivery comprising: preparing an expression vector by inserting a target peptide into an extracellular membrane domain of a transmembrane protein of an exosome; and producing the exosome comprising the target peptide located at the exosome membrane. Further, the present invention shows that the inserted target peptide is well expressed in HEK293T cells and that an active substance trapped in the exosome is well transferred into a target tissue.

SUMMARY OF THE INVENTION

A certain embodiment of the present invention provides a method for producing the exosome that transfers the active substance specifically to the target tissue and the exosome produced by the same.

Another embodiment of the present invention provides a method for delivering the active substance to the target tissue using the exosome.

Still another embodiment of the present invention provides a pharmaceutical composition for the delivery of an active substance comprising the exosome as an active ingredient.

Still another embodiment of the present invention provides an expression vector wherein the target peptide is inserted into the extracellular membrane domain of the transmembrane protein.

DETAILED DESCRIPTION OF THE INVENTION

Figure 1B:
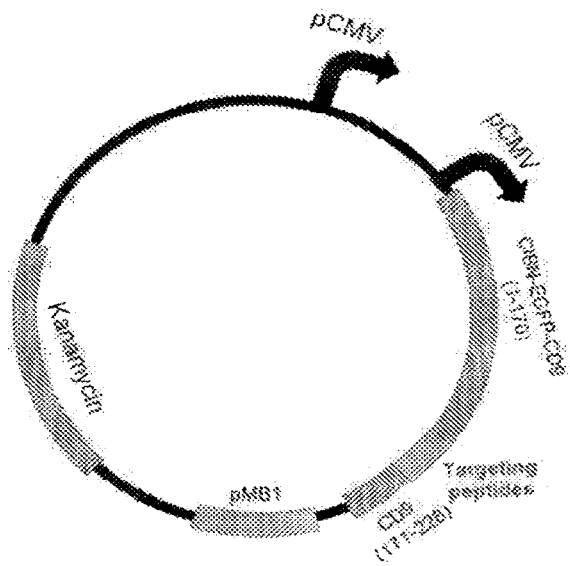
FIG. 1B is a brief diagram showing insertion location of the target peptide in the CD9 protein structure.

The present invention provides the method for producing the exosome that delivers the active substance specifically to the target tissue and the exosome produced by the same.

Another embodiment of the present invention provides the method for delivering the active substance to the target tissue using the exosome.

Still another embodiment of the present invention provides the pharmaceutical composition for the delivery of the active substance comprising the exosome as the active ingredient.

Still another embodiment of the present invention provides the expression vector wherein the target peptide is inserted into the extracellular membrane domain of the transmembrane protein.

The present invention relates to 1) the method for preparing the expression vector by inserting the target peptide into the extracellular membrane domain of the transmembrane protein of the exosome; and 2) the method for producing the exosome for target specific delivery of the active substance by introducing the said expression vector into an exosome-producing cell.

As used herein, the term "transmembrane protein" is a protein which locates and attached to the lipid bilayer of cells. It has hydrophobic regions containing a high fraction of polar amino acids. Certain hydrophobic regions locate inside the bilayer while more hydrophilic regions are in contact with the aqueous intracellular and extracellular environments. In one embodiment of the invention, the transmembrane protein is selected from the group such as, but not limited to tetraspanin, integrin, ICAM-1, MHC-I, MHC-II, annexin and Rab.

As used herein, the term "tetraspanin" is a membrane protein that has four transmembrane domains, presented on the cell membrane and receives information between cells and regulates cell proliferation. The tetraspanin is one or more proteins selected from the group comprising CD9, CD37, CD53, CD63, CD81 and CD82. In one embodiment of the invention, the tetraspanin is CD9.

The term "target peptide" as used herein, is a peptide capable of transferring a substance to a specific site in vivo. It is expressed on the surface of the exosome, allowing the exosome to migrate to the specific tissue. According to the present invention, any peptide able to migrate to the specific tissue can be used as the target peptide. In one embodiment of the invention, the target peptide is selected from but not limited to angiopeptin-2, ApoB, ApoE, VCAM-1 internalization sequence, striated muscle target peptide, Peptide-22, THR, THR retro-enantio, CTR, Leptin 20, RVG 29, CDX, Apamin, MiniAp-4, GSH, G23, g7, TGN, TAT (45-57), SynB1, Diketopeperazines and PhPro. The target peptide is inserted into the extracellular membrane domain of the transmembrane protein, wherein the insertion does not affect the expression or the function of the transmembrane. For example, the target peptide is inserted between amino acid position 170-171 from the N-terminus of the CD9 (SEQ ID NO: 3).

The term "specific site" as used herein, is the specific tissue where the target peptide migrates to. In one embodiment of the invention, the specific site is selected from but not limited to blood brain barrier, inflamed blood vessels, striated muscle, liver and cancer tissue.

The "expression vector" refers to a recombinant vector capable of expressing a desired peptide from a desired host cell, including an operatively linked necessary regulatory element to express the gene insert. The expression vector comprises expression control elements such as an initiation codon, a termination codon, a promoter, and an operator, etc. The initiation codon and the termination codon are generally considered as a nucleotide sequence and must be in frame with a coding sequence to encode a polypeptide. The promoter of the vector can be constitutive or inducible.

The term "operably linked" of the present invention means a functional linkage between a nucleic acid expression sequence and a nucleic acid sequence encoding a desired protein or RNA to perform a general function. For example, the expression of the coding sequence can be affected by operably linked a promoter and the protein or RNA coding nucleic sequence. The operable linkage with the expression vector can be produced by using recombinant DNA techniques well known in the art. A site-specific DNA cleavage and linkage can be achieved by using enzymes generally known in the art.

In addition, the expression vector may further includes a "selection marker". Selection markers are markers for selection of a transformed microorganism or a recombinant vector which is used to confer selectable phenotypes, such as drug resistance, nutritional requirements, resistance to cytotoxic agents or expression of surface proteins. The transformed cells are selected using the vector containing the selection marker, as only the cells expressing the selection marker in the selected agent's environment can survive. The selection marker is selected from but not limited to the antibiotic resistance gene, for example kanamycin, ampicillin, and puromycin.

The "exosome-producing cell" is one or more selected from the group consisting of B-lymphocytes, T-lymphocytes, dendritic cells, macrophage cells, macrophages, stem cells, and tumor cells. In one embodiment of the invention, the exosome-producing cell is HEK293T cell.

As used herein, the term "active substance" refers to a substance that enhances or inhibits a biological function, wherein the active substance controls the secretion of substances that regulate the function of the human body exhibiting abnormal conditions. The active substance is selected from but not limited to a protein drug, an enzyme, a nucleic acid, a chemical and a mixture thereof.

Figure 1A:
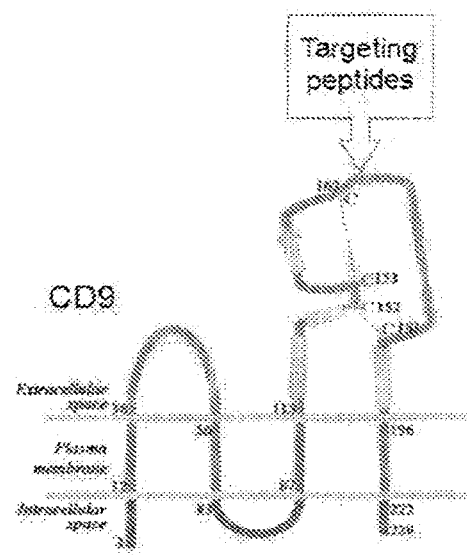
FIG. 1A is a schematic diagram of a pSF-CMV-CMV-Sbfl vector comprising a ClBN gene, an EGFP gene, and a target peptide inserted CD9 gene complex.
Figure 2:
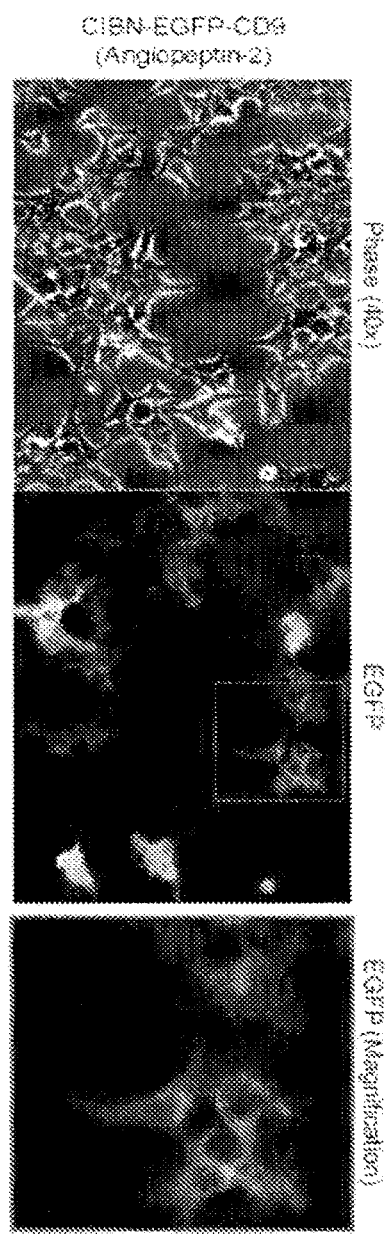
FIG. 2 is an image showing the expression of an Angiopeptin-2 peptide complex in HEK293T cells treated with the exosome comprising the Angiopeptin-2 peptide complex.
Figure 5:
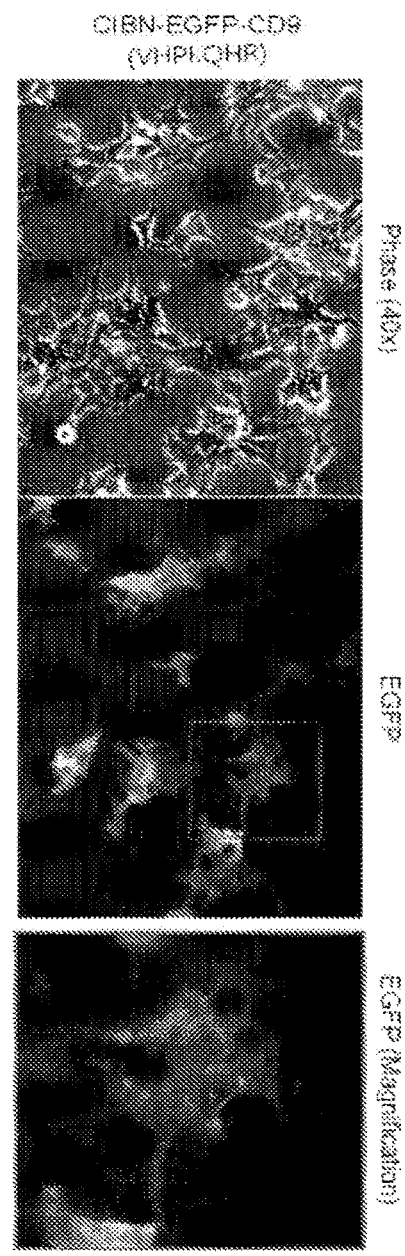
FIG. 5 is an image showing the expression of a VCAM-1 internalization sequence peptide complex in HEK293T cells treated with the exosome comprising the VCAM-1 internalization sequence peptide complex.
Figure 6:
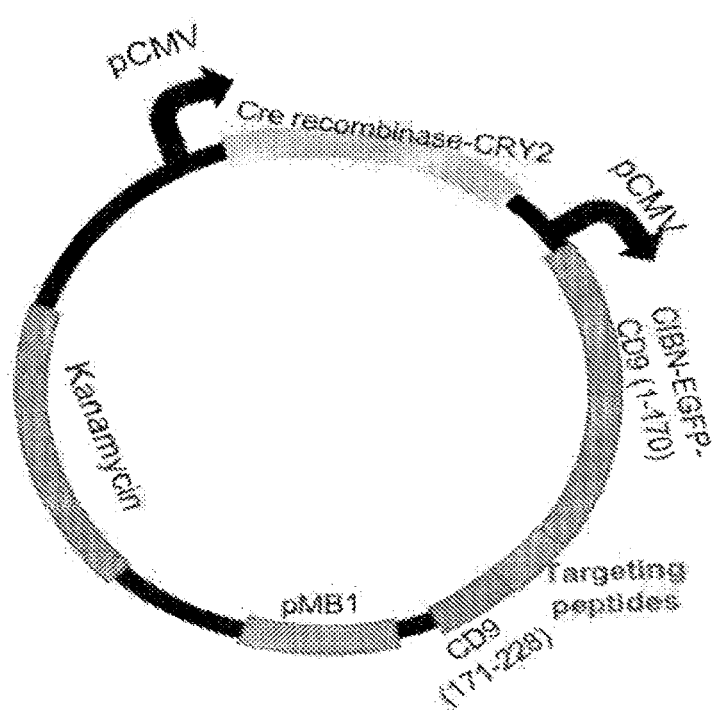
FIG. 6 shows a schematic diagram of a pSF-CMV-CMV-Sbfl vector comprising a Cre recombinase-CRY2 gene, the ClBN gene, the EGFP gene, and the target peptide inserted CD9 gene complex.

One embodiment of the present invention provides the pSF-CMV-CMV-Sbfl vector comprising the ClBN gene, the EGFP gene, and the target peptide complex inserted CD9 encoding gene, wherein the target peptide is selected from but not limited to angiopeptin-2, ApoB, ApoE, VCAM-1 internalization sequence, striated muscle target peptide, Peptide-22, THR, THR retro-enantio, CTR, Leptin 20, RVG 29, CDX, Apamin, MiniAp-4, GSH, G23, g7, TGN, TAT (45-57), SynB1, Diketopeperazines and PhPro. The said vector is introduced into exosome-producing cells such as HEK293T cells to obtain exosomes with target peptide labeled in the membrane protein (FIG. 1). FIGS. 2 and 5 show the expression of the target peptide in exosome membrane protein.

The present invention also provides the method for producing the exosome for target specific delivery of the active substance comprising:
1) preparing the expression vector by inserting the target peptide into the extracellular membrane domain of the transmembrane protein; and
2) introducing the expression vector of step 1) into the exosome-producing cell.

The transmembrane protein is selected from the group such as, but not limited to tetraspanin, integrin, ICAM-1, MHC-I, MHC-II, annexin and Rab. The tetraspanin is selected from the group consisting CD9, CD37, CD53, CD63, CD81 and CD82. In one embodiment of the invention, the tetraspanin is CD9.

The target peptide is any peptides able to migrate to the specific tissue. In one embodiment of the invention, the target peptide is selected from but not limited to angiopeptin-2, ApoB, ApoE, VCAM-1 internalization sequence, striated muscle target peptide, Peptide-22, THR, THR retro-enantio, CTR, Leptin 20, RVG 29, CDX, Apamin, MiniAp-4, GSH, G23, g7, TGN, TAT (45-57), SynB1, Diketopeperazines and PhPro.

The exosome-producing cell is one or more selected from the group comprising B-lymphocytes, T-lymphocytes, dendritic cells, macrophage cells, macrophages, stem cells, or tumor cells. In one embodiment of the invention, the exosome-producing cell is HEK293T cell.

In a specific embodiment of the present invention provides the pSF-CMV-CMV-Sbfl vector comprising the ClBN gene, the EGFP gene, and the target peptide complex inserted CD9 encoding gene, wherein the target peptide is selected from but not limited to angiopeptin-2, ApoB, ApoE, VCAM-1 internalization sequence and striated muscle target peptide. The said vector is introduced into exosome-producing cells such as HEK293T cells to obtain exosomes with target peptide labeled in the membrane protein (FIG. 1B). FIGS. 2 and 5 shows the expression of the target peptide in exosome membrane protein.

The present invention also provides the method for delivering the active substance to the target tissue using the exosome prepared by the method of the present invention.

The method comprises:
1) preparing the expression vector by inserting the target peptide into the extracellular membrane domain of the transmembrane protein; and
2) introducing the expression vector of step 1) into the exosome-producing cell.

The transmembrane protein is selected from the group such as, but not limited to tetraspanin, integrin, ICAM-1, MHC-I, MHC-II, annexin and Rab. The tetraspanin is selected from the group consisting CD9, CD37, CD53, CD63, CD81 and CD82. In one embodiment of the invention, the tetraspanin is CD9.

The target peptide is any peptides able to migrate to the specific tissue. In one embodiment of the invention, the target peptide is selected from but not limited to angiopeptin-2, ApoB, ApoE, VCAM-1 internalization sequence, striated muscle target peptide, Peptide-22, THR, THR retro-enantio, CTR, Leptin 20, RVG 29, CDX, Apamin, MiniAp-4, GSH, G23, g7, TGN, TAT (45-57), SynB1, Diketopeperazines and PhPro.

The exosome-producing cell is one or more selected from the group comprising B-lymphocytes, T-lymphocytes, dendritic cells, macrophage cells, macrophages, stem cells, or tumor cells. In one embodiment of the invention, the exosome-producing cell is HEK293T cell.

In a specific embodiment of the present invention provides the pSF-CMV-CMV-Sbfl vector comprising the ClBN gene, the EGFP gene, and the target peptide complex inserted CD9 encoding gene, wherein the target peptide is selected from but not limited to angiopeptin-2, ApoB, ApoE, VCAM-1 internalization sequence and striated muscle target peptide. The said vector is introduced into exosome-producing cells such as HEK293T cells to obtain exosomes with target peptide labeled in the membrane protein (FIG. 1B). FIGS. 2 and 5 shows the expression of the target peptide in exosome membrane protein.

The present invention also provides the pharmaceutical composition for the delivery of the active substance comprising the exosome as the active ingredient, wherein the amount of the exosome is about 10 to about 95% of the total weight of the composition.

The pharmaceutical composition of the present invention further comprises one or more active ingredients showing the same or similar functions to the above-mentioned active ingredient.

The pharmaceutical composition of the present invention further comprises pharmaceutically acceptable carriers, diluents, excipients and a mixture thereof. The pharmaceutically acceptable carrier is selected from but not limited to, chemicals listed in Merck Index, 13th ed., Merck & Co. Inc., saline solution, sterilized water, Ringer's solution, buffered saline, dextrose solution, maltodextrin solution, glycerol, ethanol and a mixture thereof. The pharmaceutical composition further comprises other conventional additives such as an antioxidant, a buffer, and a bacteriostatic agent.

The pharmaceutical composition further comprises a diluent or an excipient such as a filler, an extender, a binder, a wetting agent, a disintegrating agent, and a surfactant.

The pharmaceutical composition of the present invention is formulated into an oral or a parenteral preparation.

A solid formulation for the oral administration includes tablets, pills, powders, granules, capsules, troches and thereof. The solid formulation for the oral administration comprises one or more excipients such as starch, calcium carbonate, sucrose, lactose, gelatin, and thereof. The solid formulation further comprises lubricants such as magnesium stearate and talc.

A liquid formulation for the oral administration includes suspensions, solutions, emulsions, syrups and thereof. The liquid formulation comprises wetting agents, sweeteners, fragrances, preservatives and thereof.

The parenteral administration includes injections such as sterile aqueous solutions, non-aqueous solutions, suspensions, and emulsions. The non-aqueous solvent and the suspending agent is selected from the group comprising propylene glycol, polyethylene glycol, vegetable oil such as olive oil, injectable ester such as ethyl oleate, or thereof.

The pharmaceutical composition of the present invention is administered orally or parenterally according to the desired method. The parenteral administration is selected from external and intraperitoneal injection, intraperitoneal injection is selected from but not limited to rectal injection, subcutaneous injection, intravenous injection, and intramuscular injection.

The pharmaceutical composition according to the invention is administered in a pharmaceutically effective amount. The pharmaceutical effective amount varies on the type of disease, severity, activity of the drug, sensitivity to the drug, administration time, administration route, rate of excretion, duration of treatment, concurrent medication and thereof. The pharmaceutical composition of the present invention is administered alone or in combination with other therapeutic agents. When co-administered with other therapeutic agents, administration may be sequential or simultaneous.

The pharmaceutical composition of the present invention comprises the active ingredient wherein the pharmaceutically effective amount is 0.001-10 g/Kg, 0.01-8 g/Kg or 0.1-5 g/Kg. The administration can be once or several times a day.

In addition, the present invention provides the expression vector wherein the target peptide is inserted into the extracellular domain of the transmembrane protein.

The transmembrane protein is selected from the group such as, but not limited to tetraspanin, integrin, ICAM-1, MHC-I, MHC-II, annexin and Rab. The tetraspanin is one or more proteins selected from the group comprising CD9, CD37, CD53, CD63, CD81 or CD82. In one embodiment of the invention, the tetraspanin is CD9.

The target peptide is selected from but not limited to angiopeptin-2, ApoB, ApoE, VCAM-1 internalization sequence, striated muscle target peptide, Peptide-22, THR, THR retro-enantio, CTR, Leptin 20, RVG 29, CDX, Apamin, MiniAp-4, GSH, G23, g7, TGN, TAT (45-57), SynB1, Diketopeperazines and PhPro.

The expression vector is the recombinant vector capable of expressing the peptide of interest from the desired host cell, including the operatively linked necessary regulatory element to express the gene insert. The expression cells further comprise the selection marker. The selection marker is selected from but not limited to the antibiotic resistance gene, such as kanamycin, ampicillin, or puromycin. Any selection marker known in the art can be used.

The pharmaceutical composition may further comprises one or more other component compositions, solutions or devices suitable for the introduction of the expression vector, the culturing the transformed exosome producing cell, or the isolation and purification of the exosome produced from the transformed cells. For example, the composition further comprises a buffer suitable for the introduction of the expression vector, a medium and a container necessary for the culturing the transformed exosome producing cell and thereof.

An embodiment of the present invention provides the pSF-CMV-CMV-Sbfl vector comprising the ClBN gene, the EGFP gene, and the target peptide complex inserted CD9 encoding gene, wherein the target peptide is selected from but not limited to angiopeptin-2, ApoB, ApoE, VCAM-1 internalization sequence and striated muscle target peptide. The said vector is introduced into exosome-producing cells such as HEK293T cells to obtain exosomes with target peptide labeled in the membrane protein (FIG. 1). FIGS. 2 and 5 shows the expression of the target peptide in exosome membrane protein.

EXAMPLE

Hereinafter, the present invention will be described in detail with reference to the following examples. However, the following examples are illustrative of the present invention, and the content of the present invention is not limited thereto.

Example 1. Preparation of Exosomes Labeled with Angiopeptin-2 Peptide Complex in Exosomal Membrane Protein Angiopeptin-2 is a protein targeting the blood-brain barrier. An exosome labeled with the Angiopeptin-2 peptide in the exosome membrane protein was prepared by the following method.

First, a multicloning site of pSF-CMV-CMV-Sbfl vector (#OG411, Oxford Genetics, UK), Ndel, was digested with Ndel restriction enzyme to linearize the DNA. Thereafter, the ClBN gene (SEQ ID NO: 1), the EGFP gene (SEQ ID NO: 2), a gene fragment of CD9 encoding 1-170 amino acids from the N-terminal, a gene fragment of CD9 encoding 171-228 amino acids from the N-terminal, and a gene fragment encoding the angiopeptin-2 peptide complex (SEQ ID NO: 4) was prepared by PCR. Next, the Ndel portion of the pSF-CMV-CMV-Sbfl vector was sequentially connected by Gibson assembly so that the two ends of the three fragments were overlapped with each other by 20 to 24 bp in order to obtain vector having a sequence of ClBN-EGFP-CD9 (1-170)-angiopeptin-2 peptide complex-CD9 (171-228). The angiopeptin-2 peptide complex is consisting with three repeated angiopeptin-2 amino acid sequences (SEQ ID NO: 5), and a linker described by the amino acid sequence of GGGGS (SEQ ID NO: 6) is located between angiopeptin-2 amino acid sequences, and a linker described in the amino acid sequence of PPVAT (SEQ ID NO: 7) is inserted at both ends of the angiopeptin-2 sequences.

The vector encoding ClBN-EGFP-CD9 (1-170)-angiopeptin 2 complex-CD9 (171-228) was introduced into HEK293T cells as exosome-producing cells. 24 hours incubation was followed by 48 hours incubation in the media without fetal bovine serum. The culture was centrifuged at 1,000 rpm for 3 minutes and was filtered using a polyethersulfone membrane having a pore size of 0.2 μm. The filtrate was first concentrated through tangential flow filtration at 4° C. The concentrate was then purified using size exclusion chromatography with a sepharose bead at 4° C. 300 to 500 ml of a phosphate buffered saline was added to dilute the solution, followed by secondary concentration through tangential flow filtration at 4° C. to obtained exosomes labeled with angiopeptin-2 peptide in the exosomal membrane.

Example 2. Preparation of Exosomes Labeled with ApoB Peptide Complex in Exosomal Membrane The ApoB is a protein targeting the blood-brain barrier, and the exosome labeled with the ApoB peptide complex in the exosomal membrane was prepared by the following method.

The same steps described in Example 1 were carried out, except only the ApoB peptide complex (SEQ ID NO: 8) was inserted to obtain the exosome labeled with the ApoB peptide complex in the exosomal membrane. The ApoB peptide complex is consisting with three repeated ApoB amino acid sequences (SEQ ID NO: 9), and the linker described by the amino acid sequence of GGGGS (SEQ ID NO: 6) is located between ApoB amino acid sequences, and the linker described in the amino acid sequence of PPVAT (SEQ ID NO: 7) is inserted at both ends of the ApoB sequences.

Example 3. Preparation of Exosomes Labeled with ApoE Peptide Complex in Exosomal Membrane The ApoE is a protein targeting the blood-brain barrier, and the exosome labeled with the ApoE peptide complex in exosomal membrane was prepared by the following method.

The same steps described in Example 1 were carried out, except only the ApoE peptide complex (SEQ ID NO: 10) was inserted to obtain the exosome labeled with the ApoE peptide complex in the exosomal membrane. The ApoE peptide complex is consisting with three repeated ApoE amino acid sequences (SEQ ID NO: 11), and the linker described by the amino acid sequence of GGGGS (SEQ ID NO: 6) is located between ApoE amino acid sequences, and the linker described in the amino acid sequence of PPVAT (SEQ ID NO: 7) is inserted at both ends of the ApoE sequences.

Example 4. Production of Exosomes Labeled with VCAM-1 Internalization Sequence Peptide Complex in Exosomal Membrane The VCAM-1 (vascular cell adhesion molecule-1) is a protein targeting the vascular inflammation site, and the exosome labeled with VCAM-1 internalization sequence peptide complex in the exosomal membrane was prepared by the following method.

The same steps described in Example 1 were carried out, except only the VCAM-1 internalization sequence peptide complex (SEQ ID NO: 12) was inserted to obtain the exosome labeled with the VCAM-1 internalization sequence peptide complex in the exosomal membrane. The VCAM-1 internalization sequence peptide complex is consisting with three repeated VCAM-1 internalization amino acid sequences (SEQ ID NO: 13), and the linker described by the amino acid sequence of GGGGS (SEQ ID NO: 6) is located between VCAM-1 internalization sequences, and the linker described in the amino acid sequence of PPVAT (SEQ ID NO: 7) is inserted at both ends of the VCAM-1 internalization sequences.

Example 5. Preparation of Exosomes Labeled with Striated Muscle Target Peptide Complex in Exosomal Membrane The striated muscle target peptide is a protein targeting striated muscle, and the exosome labeled with the striated muscle target peptide in the exosomal membrane was prepared by the following method.

The same steps described in Example 1 were carried out, except only the striated muscle target peptide complex (SEQ ID NOs: 14-16) was inserted to obtain the exosome labeled with the striated muscle target peptide complex in the exosomal membrane. Striated muscle target peptide complexes are consisting with three repeated amino acid sequence, ASSLNIA (SEQ ID NO: 17), TARGEHKEEELI (SEQ ID NO: 18) or SKTFNTHPQSTP (SEQ ID NO: 19), the linker described by the amino acid sequence of GGGGS (SEQ ID NO: 6) is located between sequences, and the linker described in the amino acid sequence of PPVAT (SEQ ID NO: 7) is inserted at both ends of the sequences.

Example 6. Expression of Angiopopein-2 Peptide Complex

The exosome of Example 1 was transfected to HEK293T cells. The expression of the angioprotein-2 peptide complex in the exosomal membrane was confirmed through a fluorescence microscope after 24 hours. FIG. 2 shows the expression of the angioprotein-2 peptide complex in the exosomal membrane.

Example 7. Expression of ApoB Peptide Complex

Figure 3:
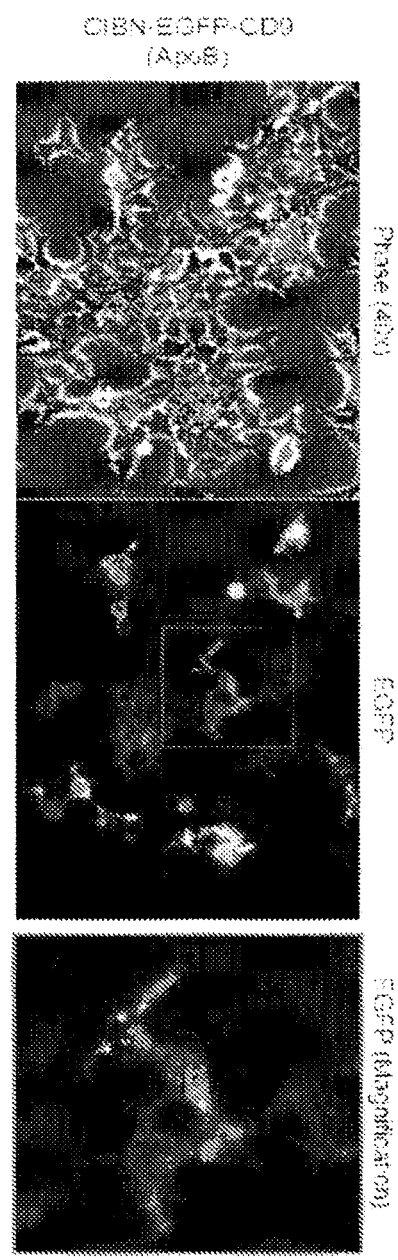
FIG. 3 is an image showing the expression of an ApoB peptide complex in HEK293T cells treated with the exosome comprising the ApoB peptide complex.

The exosome of Example 2 was transfected to HEK293T cells. The expression of the ApoB peptide complex in the exosomal membrane was confirmed through the fluorescence microscope after 24 hours. FIG. 3 shows the expression of the ApoB peptide complex in the exosomal membrane.

Example 8. Expression of ApoE Peptide Complex

Figure 4:
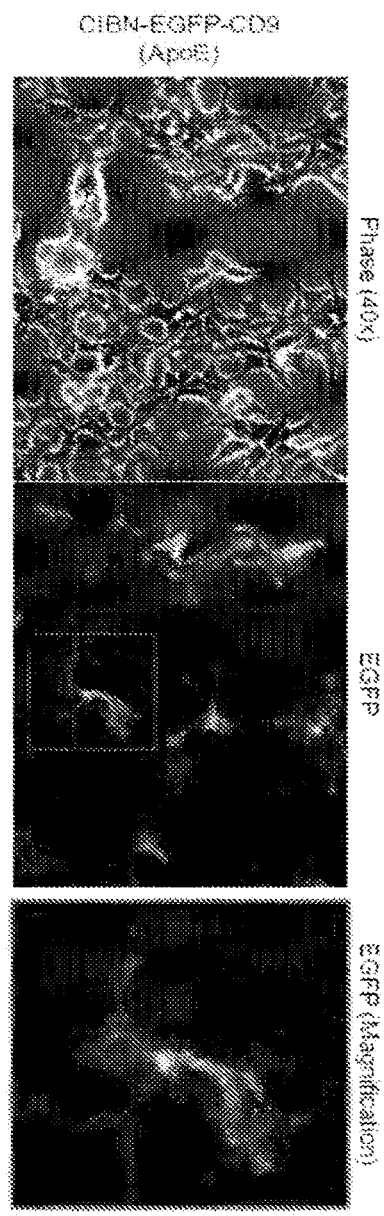
FIG. 4 is an image showing the expression of an ApoE peptide complex in HEK293T cells treated with the exosome comprising the ApoE peptide complex.

The exosome of Example 3 was transfected to HEK293T cells. The expression of the ApoE peptide complex in the exosomal membrane was confirmed through the fluorescence microscope after 24 hours. FIG. 4 shows the expression of the ApoE peptide complex in the exosomal membrane.

Example 9. Expression of VCAM-1 Internalization Sequence Peptide Complex

The exosome of Example 4 was transfected to HEK293T cells. The expression of the VCAM-1 internalization sequence peptide complex in the exosomal membrane was confirmed through the fluorescence microscope after 24 hours. FIG. 5 shows the expression of the VCAM-1 internalization sequence peptide complex in the exosomal membrane.

Example 10. Expression of Striated Muscle Target Peptide Complex

The exosome of Example 5 was transfected to HEK293T cells. The expression of the striated muscle target peptide complex in the exosomal membrane was confirmed through the fluorescence microscope after 24 hours. The expression of the striated muscle target peptide complex in the exosomal membrane was confirmed.

Example 11. Target-Specific Delivery of Exosomes Labeled with Angiopeptin-2 Peptide Complex on Exosomal Membrane The vector encoding ClBN-EGFP-CD9 (1-170)-angiopeptin 2 peptide complex-CD9 (171-228) was obtained with the same steps described in Example 1, except that an additional Cre recombinase-CRY2 gene was further inserted under an LED emitting light of 460 nm at an intensity of 100 μW. The vector was introduced to HEK293T as the exosome production cell. 24 hours incubation was followed by 48 hours incubation in the media without fetal bovine serum under the LED light. The culture medium was separated by tangential flow filtration and size exclusion chromatography to obtain exosomes labeled with the angiopeptin-2 peptide complex in the exosomal membrane. An exosome in which angiopeptin-2 peptide complex was not labeled on the exosomal membrane was used as a control group. The resulting exosome at a concentration of 1×10$^9$ particles/50 μl was injected intravenously or intraperitoneally into the blood vessels of C57BL/6 loxP-eNphr3.0-loxP-eYFP TG mice (The Jackson Laboratory, Bar Harbor, Maine, USA) and organs were excised and histo-pathologically examined 48 or 72 hours after the injection. The distribution of eYFP in mice was analyzed to determine the function and distribution of the exosome labeled with the specific target peptide in vivo.

As a result, the exosome labeled with the angiopeptin-2 peptide was specifically transferred to the blood brain barrier.

Example 12. Target-Specific Delivery Effect of Exosome Labeled with ApoB Peptide Complex in Exosomal Membrane The vector encoding ClBN-EGFP-CD9 (1-170)-ApoB peptide complex-CD9 (171-228) was obtained the same steps described in Example 2, except that the additional Cre recombinase-CRY2 gene was further inserted under the LED emitting light of 460 nm at the intensity of 100 μW. Same steps described in Example 11 were carried out to determine the function and the distribution of the exosome labeled with the specific target peptide in vivo.

As a result, the exosome labeled with the ApoB peptide complex was specifically transferred to the blood brain barrier.

Example 13. Target-Specific Delivery Effect of Exosome Labeled with ApoE Peptide Complex in Exosomal Membrane The vector encoding ClBN-EGFP-CD9 (1-170)-ApoE peptide complex-CD9 (171-228) was obtained the same steps described in Example 3, except that the additional Cre recombinase-CRY2 gene was further inserted under the LED emitting light of 460 nm at the intensity of 100 μW. Same steps described in Example 11 were carried out to determine the function and the distribution of the exosome labeled with the specific target peptide in vivo.

As a result, the exosome labeled with the ApoE peptide complex was specifically transferred to the blood brain barrier.

Example 14. Target-Specific Delivery Effect of Exosome Labeled with VCAM-1 Internalization Sequence Peptide Complex in Exosomal Membrane The vector encoding ClBN-EGFP-CD9 (1-170)-VCAM-1 internalization sequence peptide complex-CD9 (171-228) was obtained the same steps described in Example 4, except that the additional Cre recombinase-CRY2 gene was further inserted under the LED emitting light of 460 nm at the intensity of 100 μW. Same steps described in Example 11 were carried out to determine the function and the distribution of the exosome labeled with the specific target peptide in vivo.

As a result, it was confirmed that the exosome labeled with the VCAM-1 internalization sequence peptide complex in the membrane protein was specifically transferred to the site of vascular inflammation.

Example 15. Target-Specific Delivery Effect of Exosome Labeled with Striated Muscle Target Peptide Complex in Exosomal Membrane The vector encoding ClBN-EGFP-CD9 (1-170)-striated muscle target peptide complex-CD9 (171-228) was obtained the same steps described in Example 5, except that the additional Cre recombinase-CRY2 gene was further inserted under the LED emitting light of 460 nm at the intensity of 100 μW. Same steps described in Example 11 were carried out to determine the function and the distribution of the exosome labeled with the specific target peptide in vivo.

As a result, it was confirmed that exosome labeled with the striated muscle target peptide complex in the membrane protein was specifically transferred to the striated muscle.

SEQUENCE LISTING

```
Sequence total quantity: 84
SEQ ID NO: 1            moltype = AA  length = 317
FEATURE                 Location/Qualifiers
source                  1..317
                        mol_type = protein
                        organism = Homo sapiens
SEQUENCE: 1
MFQAAERPQE WAMEGPRDGL KKERLLDDRH DSGLDSMKDE EYEQMVKELQ EIRLEPQEVP   60
RGSEPWKQQL TEDGDSFLHL AIIHEEKALT MEVIRQVKGD LAFLNFQNNL QQTPLHLAVI  120
TNQPEIAEAL LGAGCDPELR DFRGNTPLHL ACEQGCLASV GVLTQSCTTP HLHSILKATN  180
YNGHTCLHLA SIHGYLGIVE LLVSLGADVN AQEPCNGRTA LHLAVDLQNP DLVSLLLKCG  240
ADVNRVTYQG YSPYQLTWGR PSTRIQQQLG QLTLENLQML PESEDEESYD TESEFTEFTE  300
DELPYDDCVF GGQRLTL                                                317

SEQ ID NO: 2            moltype = AA  length = 356
FEATURE                 Location/Qualifiers
source                  1..356
                        mol_type = protein
                        organism = Homo sapiens
SEQUENCE: 2
MAGVACLGKA ADADEWCDSG LGSLGPDAAA PGGPGLGAEL GPGLSWAPLV FGYVTEDGDT   60
```

```
ALHLAVIHQH EPFLDFLLGF SAGTEYMDLQ NDLGQTALHL AAILGETSTV EKLYAAGAGL    120
CVAERRGHTA LHLACRVGAH ACARALLQPR PRRPREAPDT YLAQGPDRTP DTNHTPVALY    180
PDSDLEKEEE ESEEDWKLQL EAENYEGHTP LHVAVIHKDV EMVRLLRDAG ADLDKPEPTC    240
GRSPLHLAVE AQAADVLELL LRAGANPAAR MYGGRTPLGS AMLRPNPILA RLLRAHGAPE    300
PEGEDEKSGP CSSSSDSDSG DEGDEYDDIV VHSSRSQTRL PPTPASKPLP DDPRPV        356

SEQ ID NO: 3             moltype = AA   length = 500
FEATURE                  Location/Qualifiers
source                   1..500
                         mol_type = protein
                         organism = Homo sapiens
SEQUENCE: 3
MNQRRSESRP GNHRLQAYAE PGKGDSGGAG PLSGSARRGR GGGGAIRVRR PCWSGGAGRG     60
GGPAWAVRLP TVTAGWTWPA LRTLSSLRAG PSEPHSPGRR PPRAGRPLCQ ADPQPGKAAR    120
RSLEPDPAQT GPRPARAAGM SEARKGPDEA EESQYDSGIE SLRSLRSLPE STSAPASGPS    180
DGSPQPCTHP PGPVKEPQEK EDADGERADS TYGSSSLTYT LSLLGGPEAE DPAPRLPLPH    240
VGALSPQQLE ALTYISEDGD TLVHLAVIHE APAVLLCCLA LLPQEVLDIQ NNLYQTALHL    300
AVHLDQPGAV RALVLKGASR ALQDRHGDTA LHVACQRQHL ACARCLLEGR PEPGRGTSHS    360
LDLQLQNWQG LACLHIATLQ KNQPLMELLL RNGADIDVQE GTSGKTALHL AVETQERGLV    420
QFLLQAGAQV DARMLNGCTP LHLAAGRGLM GISSTLCKAG ADSLLRNVED ETPQDLTEES    480
LVLLPFDDLK ISGKLLLCTD                                                500

SEQ ID NO: 4             moltype = AA   length = 454
FEATURE                  Location/Qualifiers
source                   1..454
                         mol_type = protein
                         organism = Homo sapiens
SEQUENCE: 4
MPRCPAGAMD EGPVDLRTRP KAAGLPGAAL PLRKRPLRAP SPEPAAPRGA AGLVVPLDPL     60
RGGCDLPAVP GPPHGLARPE ALYYPGALLP LYPTRAMGSP FPLVNLPTPL YPMMCPMEHP    120
LSADIAMATR ADEDGDTPLH IAVVQGNLPA VHRLVNLFQQ GGRELDIYNN LRQTPLHLAV    180
ITTLPSVVRL LVTAGASPMA LDRHGQTAAH LACEHRSPTC LRALLDSAAP GTLDLEARNY    240
DGLTALHVAV NTECQETVQL LLERGADIDA VDIKSGRSPL IHAVENNSLS MVQLLLQHGA    300
NVNAQMYSGS SALHSASGRG LLPLVRTLVR SGADSSLKNC HNDTPLMVAR SRRVIDILRG    360
KATRPASTSQ PDPSPDRSAN TSPESSSRLS SNGLLSASPS SSPSQSPPRD PPGFPMAPPN    420
FFLPSPSPPA FLPFAGVLRG PGRPVPPSPA PGGS                                454

SEQ ID NO: 5             moltype = AA   length = 317
FEATURE                  Location/Qualifiers
source                   1..317
                         mol_type = protein
                         organism = Homo sapiens
SEQUENCE: 5
MFQAAERPQE WAMEGPRDGL KKERLLDDRH DAGLDAMKDE EYEQMVKELQ EIRLEPQEVP     60
RGSEPWKQQL TEDGDSFLHL AIIHEEKALT MEVIRQVKGD LAFLNFQNNL QQTPLHLAVI    120
TNQPEIAEAL LGAGCDPELR DFRGNTPLHL ACEQGCLASV GVLTQSCTTP HLHSILKATN    180
YNGHTCLHLA SIHGYLGIVE LLVSLGADVN AQEPCNGRTA LHLAVDLQNP DLVSLLLKCG    240
ADVNRVTYQG YSPYQLTWGR PSTRIQQQLG QLTLENLQML PESEDEESYD TESEFTEFTE    300
DELPYDDCVF GGQRLTL                                                   317

SEQ ID NO: 6             moltype = AA   length = 192
FEATURE                  Location/Qualifiers
source                   1..192
                         mol_type = protein
                         organism = Homo sapiens
SEQUENCE: 6
MDGSGEQPRG GGPTSSEQIM KTGALLLQGF IQDRAGRMGG EAPELALDPV PQDASTKKLS     60
ECLKRIGDEL DSNMELQRMI AAVDTDSPRE VFFRVAADMF SDGNFNWGRV VALFYFASKL    120
VLKALCTKVP ELIRTIMGWT LDFLRERLLG WIQDQGGWDG LLSYFGTPTW QTVTIFVAGV    180
LTASLTIWKK MG                                                        192

SEQ ID NO: 7             moltype = AA   length = 199
FEATURE                  Location/Qualifiers
source                   1..199
                         mol_type = protein
                         organism = Homo sapiens
SEQUENCE: 7
MSSGNAKIGH PAPNFKATAV MPDGQFKDIS LSDYKGKYVV FFFYPLDFTF VCPTEIIAFS     60
DRAEEFKKLN CQVIGASVDS HFCHLAWVNT PKKQGGLGPM NIPLVSDPKR TIAQDYGVLK    120
ADEGISFRGL FIIDDKGILR QITVNDLPVG RSVDETLRLV QAFQFTDKHG EVCPAGWKPG    180
SDTIKPDVQK SKEYFSKQK                                                 199

SEQ ID NO: 8             moltype = AA   length = 198
FEATURE                  Location/Qualifiers
source                   1..198
                         mol_type = protein
                         organism = Homo sapiens
SEQUENCE: 8
MASGNARIGK PAPDFKATAV VDGAFKEVKL SDYKGKYVVL FFYPLDFTFV CPTEIIAFSN     60
```

-continued

```
RAEDFRKLGC EVLGVSVDSQ FTHLAWINTP RKEGGLGPLN IPLLADVTRR LSEDYGVLKT  120
DEGIAYRGLF IIDGKGVLRQ ITVNDLPVGR SVDEALRLVQ AFQYTDEHGE VCPAGWKPGS  180
DTIKPNVDDS KEYFSKHN                                                198

SEQ ID NO: 9           moltype = AA  length = 343
FEATURE                Location/Qualifiers
source                 1..343
                       mol_type = protein
                       organism = Bacteriophage P1
SEQUENCE: 9
MSNLLTVHQN LPALPVDATS DEVRKNLMDM FRDRQAFSEH TWKMLLSVCR SWAAWCKLNN  60
RKWFPAEPED VRDYLLYLQA RGLAVKTIQQ HLGQLNMLHR RSGLPRPSDS NAVSLVMRRI  120
RKENVDAGER AKQALAFERT DFDQVRSLME NSDRCQDIRN LAFLGIAYNT LLRIAEIARI  180
RVKDISRTDG GRMLIHIGRT KTLVSTAGVE KALSLGVTKL VERWISVSGV ADDPNNYLFC  240
RVRKNGVAAP SATSQLSTRA LEGIFEATHR LIYGAKDDSG QRYLAWSGHS ARVGAARDMA  300
RAGVSIPEIM QAGGWTNVNI VMNYIRNLDS ETGAMVRLLE DGD                    343

SEQ ID NO: 10          moltype = AA  length = 469
FEATURE                Location/Qualifiers
source                 1..469
                       mol_type = protein
                       organism = Streptococcus pyogenes
SEQUENCE: 10
MHSFPPLLLL LFWGVVSHSF PATLETQEQD VDLVQKYLEK YYNLKNDGRQ VEKRRNSGPV  60
VEKLKQMQEF FGLKVTGKPD AETLKVMKQP RCGVPDVAQF VLTEGNPRWE QTHLTYRIEN  120
YTPDLPRADV DHAIEKAFQL WSNVTPLTFT KVSEGQADIM ISFVRGDHRD NSPFDGPGGN  180
LAHAFQPGPG IGGDAHFDED ERWTNNFREY NLHRVAAHEL GHSLGLSHST DIGALMYPSY  240
TFSGDVQLAQ DDIDGIQAIY GRSQNPVQPI GPQTPKACDS KLTFDAITTI RGEVMFFKDR  300
FYMRTNPFYP EVELNFISVF WPQLPNGLEA AYEFADRDEV RFFKGNKYWA VQGQNVLHGY  360
PKDIYSSFGF PRTVKHIDAA LSEENTGKTY FFVANKYWRY DEYKRSMDPG YPKMIAHDFP  420
GIGHKVDAVF MKDGFFYFFH GTRQYKFDPK TKRILTLQKA NSWFNCRKN              469

SEQ ID NO: 11          moltype = AA  length = 1300
FEATURE                Location/Qualifiers
source                 1..1300
                       mol_type = protein
                       organism = Francisella tularensis
SEQUENCE: 11
MSIYQEFVNK YSLSKTLRFE LIPQGKTLEN IKARGLILDD EKRAKDYKKA KQIIDKYHQF  60
FIEEILSSVC ISEDLLQNYS DVYFKLKKSD DDNLQKDFKS AKDTIKKQIS EYIKDSEKFK  120
NLFNQNLIDA KKGQESDLIL WLKQSKDNGI ELFKANSDIT DIDEALEIIK SFKGWTTYFK  180
GFHENRKNVY SSNDIPTSII YRIVDDNLPK FLENKAKYES LKDKAPEAIN YEQIKKDLAE  240
ELTFDIDYKT SEVNQRVFSL DEVFEIANFN NYLNQSGITK FNTIIGGKFV NGENTKRKGI  300
NEYINLYSQQ INDKTLKKYK MSVLFKQILS DTESKSFVID KLEDDSDVVT TMQSFYEQIA  360
AFKTVEEKSI KETLSLLFDD LKAQKLDLSK IYFKNDKSLT DLSQQVFDDY SVIGTAVLEY  420
ITQQIAPKNL DNPSKKEQEL IAKKTEKAKY LSLETIKLAL EEFNKHRDID KQCRFEEILA  480
NFAAIPMIFD EIAQNKDNLA QISIKYQNQG KKDLLQASAE DDVKAIKDLL DQTNNLLHKL  540
KIFHISQSED KANILDKDEH FYLVFEECYF ELANIVPLYN KIRNYITQKP YSDEKFKLNF  600
ENSTLANGWD KNKEPDNTAI LFIKDDKYYL GVMNKKNNKI FDDKAIKENK GEGYKKIVYK  660
LLPGANKMLP KVFFSAKSIK FYNPSEDILR IRNHSTHTKN GSPQKGYEKF EFNIEDCRKF  720
IDFYKQSISK HPEWKDFGFR FSDTQRYNSI DEFYREVENQ GYKLTFENIS ESYIDSVVNQ  780
GKLYLFQIYN KDFSAYSKGR PNLHTLYWKA LFDERNLQDV VYKLNGEAEL FYRKQSIPKK  840
ITHPAKEAIA NKNKDNPKKE SVFEYDLIKD KRFTEDKFFF HCPITINFKS SGANKFNDEI  900
NLLLKEKAND VHILSIDRGE RHLAYYTLVD GKGNIIKQDT FNIIGNDRMK TNYHDKLAAI  960
EKDRDSARKD WKKINNIKEM KEGYLSQVVH EIAKLVIEYN AIVVFEDLNF GFKRGRFKVE  1020
KQVYQKLEKM LIEKLNYLVF KDNEFDKTGG VLRAYQLTAP FETFKKMGKQ TGIIYYVPAG  1080
FTSKICPVTG FVNQLYPKYE SVSKSQEFFS KFDKICYNLD KGYFEFSFDY KNFGDKAAKG  1140
KWTIASFGSR LINFRNSDKN HNWDTREVYP TKELEKLLKD YSIEYGHGEC IKAAICGESD  1200
KKFFAKLTSV LNTILQMRNS KTGTELDYLI SPVADVNGNF FDSRQAPKNM PQDADANGAY  1260
HIGLKGLMLL GRIKNNQEGK KLNLVIKNEE YFEFVQNRNN                        1300

SEQ ID NO: 12          moltype = AA  length = 536
FEATURE                Location/Qualifiers
source                 1..536
                       mol_type = protein
                       organism = Homo sapiens
SEQUENCE: 12
MEFSSPSREE CPKPLSRVSI MAGSLTGLLL LQAVSWASGA RPCIPKSFGY SSVVCVCNAT  60
YCDSFDPPTF PALGTFSRYE STRSGRRMEL SMGPIQANHT GTGLLLTLQP EQKFQKVKGF  120
GGAMTDAAAL NILALSPPAQ NLLLKSYFSE EGIGYNIIRV PMASCDFSIR TYTYADTPDD  180
FQLHNFSLPE EDTKLKIPLI HRALQLAQRP VSLLASPWTS PTWLKTNGAV NGKGSLKGQP  240
GDIYHQTWAR YFVKFLDAYA EHKLQFWAVT AENEPSAGLL SGYPFQCLGF TPEHQRDFIA  300
RDLGPTLANS THHNVRLLML DDQRLLLPHW AKVVLTDPEA AKYVHGIAVH WYLDFLAPAK  360
ATLGETHRLF PNTMLFASEA CVGSKFWEQS VRLGSWDRGM QYSHSIITNL LYHVVGWTDW  420
NLALNPEGGP NWVRNFVDSP IIVDITKDTF YKQPMFYHLG HFSKFIPEGS QRVGLVASQK  480
NDLDAVALMH PDGSAVVVVL NRSSKDVPLT IKDPAVGFLE TISPGYSIHT YLWRRQ      536

SEQ ID NO: 13          moltype = AA  length = 469
FEATURE                Location/Qualifiers
```

```
source                  1..469
                        mol_type = protein
                        organism = Homo sapiens
SEQUENCE: 13
MHSFPPLLLL LFWGVVSHSF PATLETQEQD VDLVQKYLEK YYNLKNDGRQ VEKRRNSGPV    60
VEKLKQMQEF FGLKVTGKPD AETLKVMKQP RCGVPDVAQF VLTEGNPRWE QTHLTYRIEN   120
YTPDLPRADV DHAIEKAFQL WSNVTPLTFT KVSEGQADIM ISFVRGDHRD NSPFDGPGGN   180
LAHAFQPGPG IGGDAHFDED ERWTNNFREY NLHRVAAHEL GHSLGLSHST DIGALMYPSY   240
TFSGDVQLAQ DDIDGIQAIY GRSQNPVQPI GPQTPKACDS KLTFDAITTI RGEVMFFKDR   300
FYMRTNPFYP EVELNFISVF WPQLPNGLEA AYEFADRDEV RFFKGNKYWA VQGQNVLHGY   360
PKDIYSSFGF PRTVKHIDAA LSEENTGKTY FFVANKYWRY DEYKRSMDPG YPKMIAHDFP   420
GIGHKVDAVF MKDGFFYFFH GTRQYKFDPK TKRILTLQKA NSWFNCRKN              469

SEQ ID NO: 14           moltype = AA  length = 207
FEATURE                 Location/Qualifiers
source                  1..207
                        mol_type = protein
                        organism = Homo sapiens
SEQUENCE: 14
MAPFEPLASG ILLLLWLIAP SRACTCVPPH PQTAFCNSDL VIRAKFVGTP EVNQTTLYQR    60
YEIKMTKMYK GFQALGDAAD IRFVYTPAME SVCGYFHRSH NRSEEFLIAG KLQDGLLHIT   120
TCSFVAPWNS LSLAQRRGFT KTYTVGCEEC TVFPCLSIPC KLQSGTHCLW TDQLLQGSEK   180
GFQSRHLACL PREPGLCTWQ SLRSQIA                                      207

SEQ ID NO: 15           moltype = AA  length = 220
FEATURE                 Location/Qualifiers
source                  1..220
                        mol_type = protein
                        organism = Homo sapiens
SEQUENCE: 15
MGAAARTLRL ALGLLLLATL LRPADACSCS PVHPQQAFCN ADVVIRAKAV SEKEVDSGND    60
IYGNPIKRIQ YEIKQIKMFK GPEKDIEFIY TAPSSAVCGV SLDVGGKKEY LIAGKAEGDG   120
KMHITLCDFI VPWDTLSTTQ KKSLNHRYQM GCECKITRCP MIPCYISSPD ECLWMDWVTE   180
KNINGHQAKF FACIKRSDGS CAWYRGAAPP KQEFLDIEDP                        220

SEQ ID NO: 16           moltype = AA  length = 211
FEATURE                 Location/Qualifiers
source                  1..211
                        mol_type = protein
                        organism = Homo sapiens
SEQUENCE: 16
MTPWLGLIVL LGSWSLGDWG AEACTCSPSH PQDAFCNSDI VIRAKVVGKK LVKEGPFGTL    60
VYTIKQMKMY RGFTKMPHVQ YIHTEASESL CGLKLEVNKY QYLLTGRVYD GKMYTGLCNF   120
VERWDQLTLS QRKGLNYRYH LGCNCKIKSC YYLPCFVTSK NECLWTDMLS NFGYPGYQSK   180
HYACIRQKGG YCSWYRGWAP PDKSIINATD P                                 211

SEQ ID NO: 17           moltype = AA  length = 224
FEATURE                 Location/Qualifiers
source                  1..224
                        mol_type = protein
                        organism = Homo sapiens
SEQUENCE: 17
MPGSPRPAPS WVLLRLLAL LRPPGLGEAC SCAPAHPQQH ICHSALVIRA KISSEKVVPA    60
SADPADTEKM LRYEIKQIKM FKGFEKVKDV QYIYTPFDSS LCGVKLEANS QKQYLLTGQV   120
LSDGKVFIHL CNYIEPWEDL SLVQRESLNH HYHLNCGCQI TTCYTVPCTI SAPNECLWTD   180
WLLERKLYGY QAQHYVCMKH VDGTCSWYRG HLPLRKEFVT IVQP                   224

SEQ ID NO: 18           moltype = AA  length = 404
FEATURE                 Location/Qualifiers
source                  1..404
                        mol_type = protein
                        organism = Homo sapiens
SEQUENCE: 18
MADKVLKEKR KLFIRSMGEG TINGLLDELL QTRVLNKEEM EKVKRENATV MDKTRALIDS    60
VIPKGAQACQ ICITYICEED SYLAGTLGLS ADQTSGNYLN MQDSQGVLSS FPAPQAVQDN   120
PAMPTSSGSE GNVKLCSLEE AQRIWKQKSA EIYPIMDKSS RTRLALIICN EEFDSIPRRT   180
GAEVDITGMT MLLQNLGYSV DVKKNLTASD MTTELEAFAH RPEHKTSDST FLVFMSHGIR   240
EGICGKKHSE QVPDILQLNA IFNMLNTKNC PSLKDKPKVI IIQACRGDSP GVVWFKDSVG   300
VSGNLSLPTT EEFEDDAIKK AHIEKDFIAF CSSTPDNVSW RHPTMGSVFI GRLIEHMQEY   360
ACSCDVEEIF RKVRFSFEQP DGRAQMPTTE RVTLTRCFYL FPGH                   404

SEQ ID NO: 19           moltype = AA  length = 452
FEATURE                 Location/Qualifiers
source                  1..452
                        mol_type = protein
                        organism = Homo sapiens
SEQUENCE: 19
MAAPSAGSWS TFQHKELMAA DRGRRILGVC GMHPHHQETL KKNRVVLAKQ LLLSELLEHL    60
LEKDIITLEM RELIQAKVGS FSQNVELLNL LPKRGPQAFD AFCEALRETK QGHLEDMLLT   120
```

```
TLSGLQHVLP PLSCDYDLSL PFPVCESCPL YKKLRLSTDT VEHSLDNKDG PVCLQVKPCT    180
PEFYQTHFQL AYRLQSRPRG LALVLSNVHF TGEKELEFRS GGDVDHSTLV TLFKLLGYDV    240
HVLCDQTAQE MQEKLQNFAQ LPAHRVTDSC IVALLSHGVE GAIYGVDGKL LQLQEVFQLF    300
DNANCPSLQN KPKMFFIQAC RGDETDRGVD QQDGKNHAGS PGCEESDAGK EKLPKMRLPT    360
RSDMICGYAC LKGTAAMRNT KRGSWYIEAL AQVFSERACD MHVADMLVKV NALIKDREGY    420
APGTEFHRCK EMSEYCSTLC RHLYLFPGHP PT                                 452

SEQ ID NO: 20           moltype = AA  length = 277
FEATURE                 Location/Qualifiers
source                  1..277
                        mol_type = protein
                        organism = Homo sapiens
SEQUENCE: 20
MENTENSVDS KSIKNLEPKI IHGSESMDSG ISLDNSYKMD YPEMGLCIII NNKNFHKSTG     60
MTSRSGTDVD AANLRETFRN LKYEVRNKND LTREEIVELM RDVSKEDHSK RSSFVCVLLS    120
HGEEGIIFGT NGPVDLKKIT NFFRGDRCRS LTGKPKLFII QACRGTELDC GIETDSGVDD    180
DMACHKIPVE ADFLYAYSTA PGYYSWRNSK DGSWFIQSLC AMLKQYADKL EFMHILTRVN    240
RKVATEFESF SFDATFHAKK QIPCIVSMLT KELYFYH                            277

SEQ ID NO: 21           moltype = AA  length = 377
FEATURE                 Location/Qualifiers
source                  1..377
                        mol_type = protein
                        organism = Homo sapiens
SEQUENCE: 21
MAEGNHRKKP LKVLESLGKD FLTGVLDNLV EQNVLNWKEE EKKKYYDAKT EDKVRVMADS     60
MQEKQRMAGQ MLLQTFFNID QISPNKKAHP NMEAGPPESG ESTDALKLCP HEEFLRLCKE    120
RAEEIYPIKE RNNRTRLALI ICNTEFDHLP PRNGADFDIT GMKELLEGLD YSVDVEENLT    180
ARDMESALRA FATRPEHKSS DSTFLVLMSH GILEGICGTV HDEKKPDVLL YDTIFQIFNN    240
RNCLSLKDKP KVIIVQACRG ANRGELWVRD SPASLEVASS QSSENLEEDA VYKTHVEKDF    300
IAFCSSTPHN VSWRDTMGS IFITQLITCF QKYSWCCHLE EVFRKVQQSF ETPRAKAQMP    360
TIERLSMTRY FYLFPGN                                                  377

SEQ ID NO: 22           moltype = AA  length = 434
FEATURE                 Location/Qualifiers
source                  1..434
                        mol_type = protein
                        organism = Homo sapiens
SEQUENCE: 22
MAEDSGKKKR RKNFEAMFKG ILQSGLDNFV INHMLKNNVA GQTSIQTLVP NTDQKSTSVK     60
KDNHKKKTVK MLEYLGKDVL HGVFNYLAKH DVLTLKEEEK KKYYDTKIED KALILVDSLR    120
KNRVAHQMFT QTLLNMDQKI TSVKPLLQIE AGPPESAEST NILKLCPREE FLRLCKKNHD    180
EIYPIKKRED RRRLALIICN TKFDHLPARN GAHYDIVGMK RLLQGLGYTV VDEKNLTARD    240
MESVLRAFAA RPEHKSSDST FLVLMSHGIL EGICGTAHKK KKPDVLLYDT IFQIFNNRNC    300
LSLKDKPKVI IVQACRGEKH GELWVRDSPA SLALISSQSS ENLEADSVCK IHEEKDFIAF    360
CSSTPHNVSW RDRTRGSIFI TELITCFQKY SCCCHLMEIF RKVQKSFEVP QAKAQMPTIE    420
RATLTRDFYL FPGN                                                    434

SEQ ID NO: 23           moltype = AA  length = 293
FEATURE                 Location/Qualifiers
source                  1..293
                        mol_type = protein
                        organism = Homo sapiens
SEQUENCE: 23
MSSASGLRRG HPAGGEENMT ETDAFYKREM FDPAEKYKMD HRRRGIALIF NHERFFWHLT     60
LPERRGTCAD RDNLTRRFSD LGFEVKCFND LKAEELLLKI HEVSTVSHAD ADCFVCVFLS    120
HGEGNHIYAY DAKIEIQTLT GLFKGDKCHS LVGKPKIFII QACRGNQHDV PVIPLDVVDN    180
QTEKLDTNIT EVDAASVYTL PAGADFLMCY SVAEGYYSHR ETVNGSWYIQ DLCEMLGKYG    240
SSLEFTELLT LVNRKVSQRR VDFCKDPSAI GKKQVPCFAS MLTKKLHFFP KSN           293

SEQ ID NO: 24           moltype = AA  length = 303
FEATURE                 Location/Qualifiers
source                  1..303
                        mol_type = protein
                        organism = Homo sapiens
SEQUENCE: 24
MADDQGCIEE QGVEDSANED SVDAKPDRSS FVPSLFSKKK KNVTMRSIKT TRDRVPTYQY     60
NMNFEKLGKC IIINNKNFDK VTGMGVRNGT DKDAEALPKC FRSLGFDVIV YNDCSCAKMQ    120
DLLKKASEED HTNAACFACI LLSHGEENVI YGKDGVTPIK DLTAHFRGDR CKTLLEKPKL    180
FFIQACRGTE LDDGIQADSG PINDTDANPR YKIPVEADFL FAYSTVPGYY SWRSPGRGSW    240
FVQALCSILE EHGKDLEIMQ ILTRVNDRVA RHFESQSDDP HFHEKKQIPC VVSMLTKELY    300
FSQ                                                                303

SEQ ID NO: 25           moltype = AA  length = 479
FEATURE                 Location/Qualifiers
source                  1..479
                        mol_type = protein
                        organism = Homo sapiens
SEQUENCE: 25
```

```
MDFSRNLYDI GEQLDSEDLA SLKFLSLDYI PQRKQEPIKD ALMLFQRLQE KRMLEESNLS    60
FLKELLFRIN RLDLLITYLN TRKEEMEREL QTPGRAQISA YRVMLYQISE EVSRSELRSF   120
KPLLQEEISK CKLDDDMNLL DIFIEMEKRV ILGEGKLDIL KRVCAQINKS LLKIINDYEE   180
FSKERSSSLE GSPDEFSNGE ELCGVMTISD SPREQDSESQ TLDKVYQMKS KPRGYCLIIN   240
NHNFAKAREK VPKLHSIRDR NGTHLDAGAL TTTFEELHPE IKPHDDCTVE QIYEILKIYQ   300
LMDHSNMDCF ICCILSHGDK GIIYGTDGQE APIYELTSQF TGLKCPSLAG KPKVFFIQAC   360
QGDNYQKGIP VETDSEEQPY LEMDLSSPQT RYIPDEADFL LGMATVNNCV SYRNPAEGTW   420
YIQSLCQSLR ERCPRGDDIL TILTEVNYEV SNKDDKKNMG KQMPQPTFTL RKKLVFPSD    479

SEQ ID NO: 26           moltype = AA  length = 416
FEATURE                 Location/Qualifiers
source                  1..416
                        mol_type = protein
                        organism = Homo sapiens
SEQUENCE: 26
MDEADRRLLR RCRLRLVEEL QVDQLWDALL SRELFRPHMI EDIQRAGSGS RRDQARQLII    60
DLETRGSQAL PLFISCLEDT GQDMLASFLR TNRQAAKLSK PTLENLTPVV LRPEIRKPEV   120
LRPETPRPVD IGSGGFGDVG ALESLRGNAD LAYILSMEPC GHCLIINNVN FCRESGLRTR   180
TGSNIDCEKL RRRFSSLHFM VEVKGDLTAK KMVLALLELA QQDHGALDCC VVVILSHGCQ   240
ASHLQFPGAV YGTDGCPVSV EKIVNIFNGT SCPSLGGKPK LFFIQACGGE QKDHGFEVAS   300
TSPEDESPGS NPEPDATPFQ EGLRTFDQLD AISSLPTPSD IFVSYSTFPG FVSWRDPKSG   360
SWYVETLDDI FEQWAHSEDL QSLLLRVANA VSVKGIYKQM PGCFNFLRKK LFFKTS       416

SEQ ID NO: 27           moltype = AA  length = 521
FEATURE                 Location/Qualifiers
source                  1..521
                        mol_type = protein
                        organism = Homo sapiens
SEQUENCE: 27
MKSQGQHWYS SSDKNCKVSF REKLLIIDSN LGVQDVENLK FLCIGLVPNK KLEKSSSASD    60
VFEHLLAEDL LSEEDPFFLA ELLYIIRQKK LLQHLNCTKE EVERLLPTRQ RVSLFRNLLY   120
ELSEGIDSEN LKDMIFLLKD SLPKTEMTSL SFLAFLEKQG KIDEDNLTCL EDLCKTVVPK   180
LLRNIEKYKR EKAIQIVTPP VDKEAESYQG EEELVSQTDV KTFLEALPQE SWQNKHAGSN   240
GNRATNGAPS LVSRGMQGAS ANTLNSETST KRAAVYRMNR NHRGLCVIVN NHSFTSLKDR   300
QGTHKDAEIL SHVFQWLGFT VHIHNNVTKV EMEMVLQKQK CNPAHADGDC FVFCILTHGR   360
FGAVYSSDEA LIPIREIMSH FTALQCPRLA EKPKLFFIQA CQGEEIQPSV SIEADALNPE   420
QAPTSLQDSI PAEADFLLGL ATVPGYVSFR HVEEGSWYIQ SLCNHLKKLV PRMLKFLEKT   480
MEIRGRKRTV WGAKQISATS LPTAISAQTP RPPMRRWSSV S                      521

SEQ ID NO: 28           moltype = AA  length = 373
FEATURE                 Location/Qualifiers
source                  1..373
                        mol_type = protein
                        organism = Homo sapiens
SEQUENCE: 28
MAENKHPDKP LKVLEQLGKE VLTEYLEKLV QSNVLKLKEE DKQKFNNAER SDKRWVFVDA    60
MKKKHSKVGE MLLQTFFSVD PGSHHGEANL EMEEPEESLN TLKLCSPEEF TRLCREKTQE   120
IYPIKEANGR TRKALIICNT EFKHLSLRYG ANFDIIGMKG LLEDLGYDVV VKEELTAEGM   180
ESEMKDFAAL SEHQTSDSTF LVLMSHGTLH GICGTMHSEK TPDVLQYDTI YQIFNNCHCP   240
GLRDKPKVII VQACRGGNSG EMWIRESSKP QLCRGVDLPR NMEADAVKLS HVEKDFIAFY   300
STTPPHHLSYR DKTGGSYFIT RLISCFRKHA CSCHLFDIFL KVQQSFEKAS IHSQMPTIDR   360
ATLTRYFYLF PGN                                                     373

SEQ ID NO: 29           moltype = AA  length = 341
FEATURE                 Location/Qualifiers
source                  1..341
                        mol_type = protein
                        organism = Homo sapiens
SEQUENCE: 29
MADEKPSNGV LVHMVKLLIK TFLDGIFDDL MENNVLNTDE IHLIGKCLKF VVSNAENLVD    60
DITETAQTAG KIFREHLWNS KKQLSSDISS DGEREANMPG LNIRNKEFNY LHNRNGSELD   120
LLGMRDLLEN LGYSVVIKEN LTAQEMETAL RQFAAHPEHQ SSDSTFLVFM SHSILNGICG   180
TKHWDQEPDV LHDDTIFEIF NNRCQSLKD KPKVIIMQAC RGNGAGIVWF TTDSGKAGAD   240
THGRLLQGNI CNDAVTKAHV EKDFIAFKSS TPHNVSWRHE TNGSVFISQI IYYFREYSWS   300
HHLEEIFQKV QHSFETPNIL TQLPTIERLS MTRYFYLFPG N                      341

SEQ ID NO: 30           moltype = AA  length = 377
FEATURE                 Location/Qualifiers
source                  1..377
                        mol_type = protein
                        organism = Homo sapiens
SEQUENCE: 30
MAEDKHNKNP LKMLESLGKE LISGLLDDFV EKNVLKLEEE EKKKIYDAKL QDKARVLVDS    60
IRQKNQEAGQ VFVQTFLNID KNSTSIKAPE ETVAGPDESV GSAATLKLCP HEEFLKLCKE   120
RAGEIYPIKE RKDRTRLALI ICNTEFDHMP PRNGAALDIL GMKQLLEGLG YTVEVEEKLT   180
ARDMESVLWK FAAREEHKSS DSTFVFMSH GILDGICGTM HSEEEPDVLP YDTIFRTFNN   240
RNCLSLKDKP KVIIVQACRG ANRGELWVSD SPPALADSFS QSSENLEEDA VYKTHVEKDF   300
IAFCSSTPHN VSWRDIKKGS LFITRLITCF QKYAWCCHLE EVFRKVQQSF EKPNVKAQMP   360
TVERLSMTRY FYLFPGN                                                 377
```

```
SEQ ID NO: 31              moltype = AA   length = 242
FEATURE                    Location/Qualifiers
source                     1..242
                           mol_type = protein
                           organism = Homo sapiens
SEQUENCE: 31
MSNPRSLEEE KYDMSGARLA LILCVTKARE GSEEDLDALE HMFRQLRFES TMKRDPTAEQ    60
FQEELEKFQQ AIDSREDPVS CAFVVLMAHG REGFLKGEDV EMVKLENLFE ALNNKNCQAL   120
RAKPKVYIIQ ACRGEQRDPG ETVGGDEIVM VIKDSPQTIP TYTDALHVYS TVEGYIAYRH   180
DQKGSCFIQT LVDVFTKRKG HILELLTEVT RRMAEAELVQ EGKARKTNPE IQSTLRKRLY   240
LQ                                                                 242

SEQ ID NO: 32              moltype = AA   length = 480
FEATURE                    Location/Qualifiers
source                     1..480
                           mol_type = protein
                           organism = Homo sapiens
SEQUENCE: 32
MIRAAPPPLF LLLLLLLLLV SWASRGEAAP DQDEIQRLPG LAKQPSFRQY SGYLKGSGSK    60
HLHYWFVESQ KDPENSPVVL WLNGGPGCSS LDGLLTEHGP FLVQPDGVTL EYNPYSWNLI   120
ANVLYLESPA GVGFSYSDDK FYATNDTEVA QSNFEALQDF FRLFPEYKNN KLFLTGESYA   180
GIYIPTLAVL VMQDPSMNLQ GLAVGNGLSS YEQNDNSLVY FAYYHGLLGN RLWSSLQTHC   240
CSQNKCNFYD NKDLECVTNL QEVARIVGNS GLNIYNLYAP CAGGVPSHFR YEKDTVVVQD   300
LGNIFTRLPL KRMWHQALLR SGDKVRMDPP CTNTTAASTY LNNPYVRKAL NIPEQLPQWD   360
MCNFLVNLQY RRLYRSMNSQ YLKLLSSQKY QILLYNGDVD MACNFMGDEW FVDSLNQKME   420
VQRRPWLVKY GDSGEQIAGF VKEFSHIAFL TIKGAGHMVP TDKPLAAFTM FSRFLNKQPY   480

SEQ ID NO: 33              moltype = AA   length = 339
FEATURE                    Location/Qualifiers
source                     1..339
                           mol_type = protein
                           organism = Homo sapiens
SEQUENCE: 33
MWQLWASLCC LLVLANARSR PSFHPLSDEL VNYVNKRNTT WQAGHNFYNV DMSYLKRLCG    60
TFLGGPKPPQ RVMFTEDLKL PASFDAREQW PQCPTIKEIR DQGSCGSCWA FGAVEAISDR   120
ICIHTNAHVS VEVSAEDLLT CCGSMCGDGC NGGYPAEAWN FWTRKGLVSG GLYESHVGCR   180
PYSIPPCEHH VNGSRPPCTG EGDTPKCSKI CEPGYSPTYK QDKHYGYNSY SVSNSEKDIM   240
AEIYKNGPVE GAFSVYSDFL LYKSGVYQHV TGEMMGGHAI RILGWGVENG TPYWLVANSW   300
NTDWGDNGFF KILRGQDHCG IESEVVAGIP RTDQYWEKI                         339

SEQ ID NO: 34              moltype = AA   length = 463
FEATURE                    Location/Qualifiers
source                     1..463
                           mol_type = protein
                           organism = Homo sapiens
SEQUENCE: 34
MGAGPSLLLA ALLLLLSGDG AVRCDTPANC TYLDLLGTWV FQVGSSGSQR DVNCSVMGPQ    60
EKKVVVYLQK LDTAYDDLGN SGHFTIIYNQ GFEIVLNDYK WFAFFKYKEE GSKVTTYCNE   120
TMTGWVHDVL GRNWACFTGK KVGTASENVY VNIAHLKNSQ EKYSNRLYKY DHNFVKAINA   180
IQKSWTATTY MEYETLTLGD MIRRSGGHSR KIPRPKPAPL TAEIQQKILH LPTSWDWRNV   240
HGINFVSPVR NQASCGSCYS FASMGMLEAR IRILTNNSQT PILSPQEVVS CSQYAQGCEG   300
GFPYLIAGKY AQDFGLVEEA CFPYTGTDSP CKMKEDCFRY YSSEYHYVGG FYGGCNEALM   360
KLELVHHGPM AVAFEVYDDF LHYKKGIYHH TGLRDPFNPF ELTNHAVLLV GYGTDSASGM   420
DYWIVKNSWG TGWGENGYFR IRRGTDECAI ESIAVAATPI PKL                    463

SEQ ID NO: 35              moltype = AA   length = 412
FEATURE                    Location/Qualifiers
source                     1..412
                           mol_type = protein
                           organism = Homo sapiens
SEQUENCE: 35
MQPSSLLPLA LCLLAAPASA LVRIPLHKFT SIRRTMSEVG GSVEDLIAKG PVSKYSQAVP    60
AVTEGPIPEV LKNYMDAQYY GEIGIGTPPQ CFTVVFDTGS SNLWVPSIHC KLLDIACWIH   120
HKYNSDKSST YVKNGTSFDI HYGSGSLSGY LSQDTVSVPC QSASSASALG GVKVERQVFG   180
EATKQPGITF IAAKFDGILG MAYPRISVNN VLPVFDNLMQ QKLVDQNIFS FYLSRDPDAQ   240
PGGELMLGGT DSKYYKGSLS YLNVTRKAYW QVHLDQVEVA SGLTLCKEGC EAIVDTGTSL   300
MVGPVDEVRE LQKAIGAVPL IQGEYMIPCE KVSTLPAITL KLGGKGYKLS PEDYTLKVSQ   360
AGKTLCLSGF MGMDIPPPSG PLWILGDVFI GRYYTVFDRN NNRVGFAEAA RL           412

SEQ ID NO: 36              moltype = AA   length = 401
FEATURE                    Location/Qualifiers
source                     1..401
                           mol_type = protein
                           organism = Homo sapiens
SEQUENCE: 36
MKTLLLLLLV LLELGEAQGS LHRVPLRRHP SLKKKLRARS QLSEFWKSHN LDMIQFTESC    60
SMDQSAKEPL INYLDMEYFG TISIGSPPQN FTVIFDTGSS NLWVPSVYCT SPACKTHSRF   120
QPSQSSTYSQ PGQSFSIQYG TGSLSGIIGA DQVSAFATQV EGLTVVGQQF GESVTEPGQT   180
```

```
FVDAEFDGIL GLGYPSLAVG GVTPVFDNMM AQNLVDLPMF SVYMSSNPEG GAGSELIFGG   240
YDHSHFSGSL NWVPVTKQAY WQIALDNIQV GGTVMFCSEG CQAIVDTGTS LITGPSDKIK   300
QLQNAIGAAP VDGEYAVECA NLNVMPDVTF TINGVPYTLS PTAYTLLDFV DGMQFCSSGF   360
QGLDIHPPAG PLWILGDVFI RQFYSVFDRG NNRVGLAPAV P                      401

SEQ ID NO: 37           moltype = AA   length = 484
FEATURE                 Location/Qualifiers
source                  1..484
                        mol_type = protein
                        organism = Homo sapiens
SEQUENCE: 37
MAPWLQLLSL LGLLPGAVAA PAQPRAASFQ AWGPPSPELL APTRFALEMF NRGRAAGTRA   60
VLGLVRGRVR RAGQGSLYSL EATLEEPPCN DPMVCRLPVS KKTLLCSFQV LDELGRHVLL   120
RKDCGPVDTK VPGAGEPKSA FTQGSAMISS LSQNHPDNRN ETFSSVISLL NEDPLSQDLP   180
VKMASIFKNF VITYNRTYES KEEARWRLSV FVNNMVRAQK IQALDRGTAQ YGVTKFSDLT   240
EEEFRTIYLN TLLRKEPGNK MKQAKSVGDL APPEWDWRSK GAVTKVKDQG MCGSCWAFSV   300
TGNVEGQWFL NQGTLLSLSE QELLDCDKMD KACMGGLPSN AYSAIKNLGG LETEDDYSYQ   360
GHMQSCNFSA EKAKVYINDS VELSQNEQKL AAWLAKRGPI SVAINAFGMQ FYRHGISRPL   420
RPLCSPWLID HAVLLVGYGN RSDVPFWAIK NSWGTDWGEK GYYYLHRGSG ACGVNTMASS   480
AVVD                                                               484

SEQ ID NO: 38           moltype = AA   length = 255
FEATURE                 Location/Qualifiers
source                  1..255
                        mol_type = protein
                        organism = Homo sapiens
SEQUENCE: 38
MQPLLLLLAF LLPTGAEAGE IIGGRESRPH SRPYMAYLQI QSPAGQSRCG GFLVREDFVL   60
TAAHCWGSNI NVTLGAHNIQ RRENTQQHIT ARRAIRHPQY NQRTIQNDIM LLQLSRRVRR   120
NRNVNPVALP RAQEGLRPGT LCTVAGWGRV SMRRGTDTLR EVQLRVQRDR QCLRIFGSYD   180
PRRQICVGDR RERKAAFKGD SGGPLLCNNV AHGIVSYGKS SGVPPEVFTR VSSFLPWIRT   240
TMRSFKLLDQ METPL                                                   255

SEQ ID NO: 39           moltype = AA   length = 335
FEATURE                 Location/Qualifiers
source                  1..335
                        mol_type = protein
                        organism = Homo sapiens
SEQUENCE: 39
MWATLPLLCA GAWLLGVPVC GAAELCVNSL EKFHFKSWMS KHRKTYSTEE YHHRLQTFAS   60
NWRKINAHNN GNHTFKMALN QFSDMSFAEI KHKYLWSEPQ NCSATKSNYL RGTGPYPPSV   120
DWRKKGNFVS PVKNQGACGS CWTFSTTGAL ESAIAIATGK MLSLAEQQLV DCAQDFNNHG   180
CQGGLPSQAF EYILYNKGIM GEDTYPYQGK DGYCKFQPGK AIGFVKDVAN ITIYDEEAMV   240
EAVALYNPVS FAFEVTQDFM MYRTGIYSST SCHKTPDKVN HAVLAVGYGE KNGIPYWIVK   300
NSWGPQWGMN GYFLIERGKN MCGLAACASY PIPLV                             335

SEQ ID NO: 40           moltype = AA   length = 329
FEATURE                 Location/Qualifiers
source                  1..329
                        mol_type = protein
                        organism = Homo sapiens
SEQUENCE: 40
MWGLKVLLLP VVSFALYPEE ILDTHWELWK KTHRKQYNNK VDEISRRLIW EKNLKYISIH   60
NLEASLGVHT YELAMNHLGD MTSEEVVQKM TGLKVPLSHS RSNDTLYIPE WEGRAPDSVD   120
YRKKGYVTPV KNQGQCGSCW AFSSVGALEG QLKKKTGKLL NLSPQNLVDC VSENDGCGGG   180
YMTNAFQYVQ KNRGIDSEDA YPYVGQEESC MYNPTGKAAK CRGYREIPEG NEKALKRAVA   240
RVGPVSVAID ASLTSFQFYS KGVYYDESCN SDNLNHAVLA VGYGIQKGNK HWIIKNSWGE   300
NWGNKGYILM ARNKNNACGI ANLASFPKM                                    329

SEQ ID NO: 41           moltype = AA   length = 333
FEATURE                 Location/Qualifiers
source                  1..333
                        mol_type = protein
                        organism = Homo sapiens
SEQUENCE: 41
MNPTLILAAF CLGIASATLT FDHSLEAQWT KWKAMHNRLY GMNEEGWRRA VWEKNMKMIE   60
LHNQEYREGK HSFTMAMNAF GDMTSEEFRQ VMNGFQNRKP RKGKVFQEPL FYEAPRSVDW   120
REKGYVTPVK NQGQCGSCWA FSATGALEGQ MFRKTGRLIS LSEQNLVDCS PQGNEGCNG   180
GLMDYAFQYV QDNGGLDSEE SYPYEATEES CKYNPKYSVA NDTGFVDIPK QEKALMKAVA   240
TVGPISVAID AGHESFLFYK EGIYFEPDCS SEDMDHGVLV VGYGFESTES DNNKYWLVKN   300
SWGEEWGMGG YVKMAKDRRN HCGIASAASY PTV                               333

SEQ ID NO: 42           moltype = AA   length = 334
FEATURE                 Location/Qualifiers
source                  1..334
                        mol_type = protein
                        organism = Homo sapiens
SEQUENCE: 42
MNLSLVLAAF CLGIASAVPK FDQNLDTKWY QWKATHRRLY GANEEGWRRA VWEKNMKMIE   60
```

```
LHNGEYSQGK  HGFTMAMNAF  GDMTNEEFRQ  MMGCFRNQKF  RKGKVFREPL  FLDLPKSVDW   120
RKKGYVTPVK  NQKQCGSCWA  FSATGALEGQ  MFRKTGKLVS  LSEQNLVDCS  RPQGNQGCNG   180
GFMARAFQYV  KENGGLDSEE  SYPYVAVDEI  CKYRPENSVA  NDTGFTVVAP  GKEKALMKAV   240
ATVGPISVAM  DAGHSSFQFY  KSGIYFEPDC  SSKNLDHGVL  VVGYGFEGAN  SNNSKYWLVK   300
NSWGPEWGSN  GYVKIAKDKN  NHCGIATAAS  YPNV                                 334

SEQ ID NO: 43           moltype = AA  length = 321
FEATURE                 Location/Qualifiers
source                  1..321
                        mol_type = protein
                        organism = Homo sapiens
SEQUENCE: 43
MDVRALPWLP  WLLWLLCRGG  GDADSRAPFT  PTWPRSRERE  AAAFRESLNR  HRYLNSLFPS   60
ENSTAFYGIN  QFSYLFPEEF  KAIYLRSKPS  KFPRYSAEVH  MSIPNVSLPL  RFDWRDKQVV   120
TQVRNQQMCG  GCWAFSVVGA  VESAYAIKGK  PLEDLSVQQV  IDCSYNNYGC  NGGSTLNALN   180
WLNKMQVKLV  KDSEYPFKAQ  NGLCHYFSGS  HSGFSIKGYS  AYDFSDQEDE  MAKALLTFGP   240
LVVIVDAVSW  QDYLGGIIQH  HCSSGEANHA  VLITGFDKTG  STPYWIVRNS  WGSSWGVDGY   300
AHVKMGSNVC  GIADSVSSIF  V                                               321

SEQ ID NO: 44           moltype = AA  length = 331
FEATURE                 Location/Qualifiers
source                  1..331
                        mol_type = protein
                        organism = Homo sapiens
SEQUENCE: 44
MKRLVCVLLV  CSSAVAQLHK  DPTLDHHWHL  WKKTYGKQYK  EKNEEAVRRL  IWEKNLKFVM   60
LHNLEHSMGM  HSYDLGMNHL  GDMTSEEVMS  LMSSLRVPSQ  WQRNITYKSN  PNRILPDSVD   120
WREKGCVTEV  KYQGSCGACW  AFSAVGALEA  QLKLKTGKLV  SLSAQNLVDC  STEKYGNKGC   180
NGGFMTTAFQ  YIIDNKGIDS  DASYPYKAMD  QKCQYDSKYR  AATCSKYTEL  PYGREDVLKE   240
AVANKGPVSV  GVDARHPSFF  LYRSGVYYEP  SCTQNVNHGV  LVVGYGDLNG  KEYWLVKNSW   300
GHNFGEEGYI  RMARNKGNHC  GIASFPSYPE  I                                   331

SEQ ID NO: 45           moltype = AA  length = 376
FEATURE                 Location/Qualifiers
source                  1..376
                        mol_type = protein
                        organism = Homo sapiens
SEQUENCE: 45
MALTAHPSCL  LALLVAGLAQ  GIRGPLRAQD  LGPQPLELKE  AFKLFQIQFN  RSYLSPEEHA   60
HRLDIFAHNL  AQAQRLQEED  LGTAEFGVTP  FSDLTEEEFG  QLYGYRRAAG  GVPSMGREIR   120
SEEPEESVPF  SCDWRKVASA  ISPIKDQKNC  NCCWAMAAAG  NIETLWRISF  WDFVDVSVQE   180
LLDCGRCGDG  CHGGFVWDAF  ITVLNNSGLA  SEKDYPFQGK  VRAHRCHPKK  YQKVAWIQDF   240
IMLQNNEHRI  AQYLATYGPI  TVTINMKPLQ  LYRKGVIKAT  PTTCDPQLVD  HSVLLVGFGS   300
VKSEEGIWAE  TVSSQSQPQP  PHPTPYWILK  NSWGAQWGEK  GYFRLHRGSN  TCGITKFPLT   360
ARVQKPDMKP  RVSCPP                                                      376

SEQ ID NO: 46           moltype = AA  length = 303
FEATURE                 Location/Qualifiers
source                  1..303
                        mol_type = protein
                        organism = Homo sapiens
SEQUENCE: 46
MARRGPGWRP  LLLLVLLAGA  AQGGLYFRRG  QTCYRPLRGD  GLAPLGRSTY  PRPHEYLSPA   60
DLPKSWDWRN  VDGVNYASIT  RNQHIPQYCG  SCWAHASTSA  MADRINIKRK  GAWPSTLLSV   120
QNVIDCGNAG  SCEGGNDLSV  WDYAHQHGIP  DETCNNYQAH  DQECDKFNQC  GTCNEFKECH   180
AIRNYTLWRV  GDYGSLSGRE  KMMAEIYANG  PISCGIMATE  RLANYTGGIY  AEYQDTTYIN   240
HVVSVAGWGI  SDGTEYWIVR  NSWGEPWGER  GWLRIVTSTY  KDGKGARYNL  AIEEHCTFGD   300
PIV                                                                     303

SEQ ID NO: 47           moltype = AA  length = 338
FEATURE                 Location/Qualifiers
source                  1..338
                        mol_type = protein
                        organism = Homo sapiens
SEQUENCE: 47
MLQKPKSVKL  RALRSPRKFG  VAGRSCQEVL  RKGCLRFQLP  ERGSRLCLYE  DGTELTEDYF   60
PSVPDNAELV  LLTLGQAWQG  YVSDIRRFLS  AFHEPQVGLI  QAAQQLLCDE  QAPQRQRLLA   120
DLLHNVSQNI  AAETRAEDPP  WFEGLESRFQ  SKSGYLRYSC  ESRIRSYLRE  VSSYPSTVGA   180
EAQEEFLRVL  GSMCQRLRSM  QYNGSYFDRG  AKGGSRLCTP  EGWFSCGPF   DMDSCLSRHS   240
INPYSNRESR  ILFSTWNLDH  IIEEKKRTIIP TLVEAIKEQD  GREVDWEYFY  GLLFTSENLK   300
LVHIVCHKKT  THKLNCDPSR  IYKPQTRLKR  KQPVRKRQ                            338

SEQ ID NO: 48           moltype = AA  length = 360
FEATURE                 Location/Qualifiers
source                  1..360
                        mol_type = protein
                        organism = Homo sapiens
SEQUENCE: 48
MSQERPTFYR  QELNKTIWEV  PERYQNLSPV  GSGAYGSVCA  AFDTKTGLRV  AVKKLSRPFQ   60
```

```
SIIHAKRTYR ELRLLKHMKH ENVIGLLDVF TPARSLEEFN DVYLVTHLMG ADLNNIVKCQ    120
KLTDDHVQFL IYQILRGLKY IHSADIIHRD LKPSNLAVNE DCELKILDFG LARHTDDEMT    180
GYVATRWYRA PEIMLNWMHY NQTVDIWSVG CIMAELLTGR TLFPGTDHID QLKLILRLVG    240
TPGAELLKKI SSESARNYIQ SLTQMPKMNF ANVFIGANPL AVDLLEKMLV LDSDKRITAA    300
QALAHAYFAQ YHDPDDEPVA DPYDQSFESR DLLIDEWKSL TYDEVISFVP PPLDQEEMES    360

SEQ ID NO: 49            moltype = AA  length = 364
FEATURE                  Location/Qualifiers
source                   1..364
                         mol_type = protein
                         organism = Homo sapiens
SEQUENCE: 49
MSGPRAGFYR QELNKTVWEV PQRLQGLRPV GSGAYGSVCS AYDARLRQKV AVKKLSRPFQ     60
SLIHARRTYR ELRLLKHLKH ENVIGLLDVF TPATSIEDFS EVYLVTTLMG ADLNNIVKCQ    120
ALSDEHVQFL VYQLLRGLKY IHSAGIIHRD LKPSNVAVNE DCELRILDFG LARQADEEMT    180
GYVATRWYRA PEIMLNWMHY NQTVDIWSVG CIMAELLQGK ALFPGSDYID QLKRIMEVVG    240
TPSPEVLAKI SSEHARTYIQ SLPPMPQKDL SSIFRGANPL AIDLLGRMLV LDSDQRVSAA    300
EALAHAYFSQ YHDPEDEPEA EPYDESVEAK ERTLEEWKEL TYQEVLSFKP PEPPKPPGSL    360
EIEQ                                                                 364

SEQ ID NO: 50            moltype = AA  length = 367
FEATURE                  Location/Qualifiers
source                   1..367
                         mol_type = protein
                         organism = Homo sapiens
SEQUENCE: 50
MSSPPPARSG FYRQEVTKTA WEVRAVYRDL QPVGSGAYGA VCSAVDGRTG AKVAIKKLYR     60
PPQSELFAKR AYRELRLLKH MRHENVIGLL DVFTPDETLD DFTDFYLVMP FMGTDLGKLM    120
KHEKLGEDRI QFLVYQMLKG LRYIHAAGII HRDLKPGNLA VNEDCELKIL DFGLARQADS    180
EMTGYVVTRW YRAPEVILNW MRYTQTVDIW SVGCIMAEMI TGKTLFKGSD HLDQLKEIMK    240
VTGTPPAEFV QRLQSDEAKN YMKGLPELEK KDFASILTNA SPLAVNLLEK MLVLDAEQRV    300
TAGEALAHPY FESLHDTEDE PQVQKYDDSF DDVDRTLDEW KRVTYKEVLS FKPPRQLGAR    360
VSKETPL                                                              367

SEQ ID NO: 51            moltype = AA  length = 365
FEATURE                  Location/Qualifiers
source                   1..365
                         mol_type = protein
                         organism = Homo sapiens
SEQUENCE: 51
MSLIRKKGFY KQDVNKTAWE LPKTYVSPTH VGSGAYGSVC SAIDKRSGEK VAIKKLSRPF     60
QSEIFAKRAY RELLLLKHMQ HENVIGLLDV FTPASSLRNF YDFYLVMPFM QTDLQKIMGM    120
EFSEEKIQYL VYQMLKGLKY IHSAGVVHRD LKPGNLAVNE DCELKILDFG LARHADAEMT    180
GYVVTRWYRA PEVILSWMHY NQTVDIWSVG CIMAEMLTGK TLFKGKDYLD QLTQILKVTG    240
VPGTEFVQKL NDKAAKSYIQ SLPQTPRKDF TQLFPRASPQ AADLLEKMLE LDVDKRLTAA    300
QALTHPFFEP FRDPEEETEA QQPFDDSLEH EKLTVDEWKQ HIYKEIVNFS PIARKDSRRR    360
SGMKL                                                                365

SEQ ID NO: 52            moltype = AA  length = 403
FEATURE                  Location/Qualifiers
source                   1..403
                         mol_type = protein
                         organism = Homo sapiens
SEQUENCE: 52
MTAIIKEIVS RNKRRYQEDG FDLDLTYIYP NIIAMGFPAE RLEGVYRNNI DDVVRFLDSK     60
HKNHYKIYNL CAERHYDTAK FNCRVAQYPF EDHNPPQLEL IKPFCEDLDQ WLSEDDNHVA    120
AIHCKAGKGR TGVMICAYLL HRGKFLKAQE ALDFYGEVRT RDKKGVTIPS QRRYVYYYSY    180
LLKNHLDYRP VALLFHKMMF ETIPMFSGGT CNPQFVVCQL KVKIYSSNSG PTRREDKFMY    240
FEFPQPLPVC GDIKVEFFHK QNKMLKKDKM FHFWVNTFFI PGPEETSEKV ENGSLCDQEI    300
DSICSIERAD NDKEYLVLTL TKNDLDKANK DKANRYFSPN FKVKLYFTKT VEEPSNPEAS    360
SSTSVTPDVS DNEPDHYRYS DTTDSDPENE PFDEDQHTQI TKV                      403

SEQ ID NO: 53            moltype = AA  length = 1154
FEATURE                  Location/Qualifiers
source                   1..1154
                         mol_type = protein
                         organism = Homo sapiens
SEQUENCE: 53
MQYLNIKEDC NAMAFCAKMR SSKKTEVNLE APEPGVEVIF YLSDREPLRL GSGEYTAEEL     60
CIRAAQACRI SPLCHNLFAL YDENTKLWYA PNRTITVDDK MSLRLHYRMR FYFTNWHGTN    120
DNEQSVWRHS PKKQNGYEK KKIPDATPLL DASSLEYLFA QGQYDLVKCL APIRDPKTEQ     180
DGHDIENECL GMAVLAISHY AMMKKMQLPE LPKDISYKRY IPETLNKSIR QRNLLTRMRI    240
NNVFKDFLKE FNNKTICDSS VSTHDLKVKY LATLETLTKH YGAEIFETSM LLISSENEMN    300
WFHSNDGGNV LYYEMVTGN LGIQWRHKPN VVSVEKEKNK LKRKKLENKH KKDEEKNKIR     360
EEWNNFSYFP EITHIVIKES VVSINKQDNK KMELKLSSHE EALSFVSLVD GYFRLTADAH    420
HYLCTDVAPP LIVHNIQNGC HGPICTEYAI NKLRQEGSEE GMYVLRWSCT DFDNILMTVT    480
CFEKSEQVQG AQKQFKNFQI EVQKGRYSLH GSDRSFPSLG DLMSHLKKQI LRTDNISFML    540
KRCCQPKPRE ISNLLVATKK AQEWQPVYPM SQLSFDRILK KDLVQGEHLG RGTRTHIYSG    600
TLMDYKDDEG TSEEKKIKVI LKVLDPSHRD ISLAFFEAAS MMRQVSHKHI VYLYGVCVRD    660
```

```
VENIMVEEFV EGGPLDLFMH RKSDVLTTPW KFKVAKQLAS ALSYLEDKDL VHGNVCTKNL    720
LLAREGIDSE CGPFIKLSDP GIPITVLSRQ ECIERIPWIA PECVEDSKNL SVAADKWSFG    780
TTLWEICYNG EIPLKDKTLI EKERFYESRC RPVTPSCKEL ADLMTRCMNY DPNQRPFFRA    840
IMRDINKLEE QNPDIVSEKK PATEVDPTHF EKRFLKRIRD LGEGHFGKVE LCRYDPEGDN    900
TGEQVAVKSL KPESGGNHIA DLKKEIEILR NLYHENIVKY KGICTEDGGN GIKLIMEFLP    960
SGSLKEYLPK NKNKINLKQQ LKYAVQICKG MDYLGSRQYV HRDLAARNVL VESEHQVKIG   1020
DFGLTKAIET DKEYYTVKDD RDSPVFWYAP ECLMQSKFYI ASDVWSFGVT LHELLTYCDS   1080
DSSPMALFLK MIGPTHGQMT VTRLVNTLKE GKRLPCPPNC PDEVYQLMRK CWEFQPSNRT   1140
SFQNLIEGFE ALLK                                                    1154

SEQ ID NO: 54           moltype = AA  length = 1132
FEATURE                 Location/Qualifiers
source                  1..1132
                        mol_type = protein
                        organism = Homo sapiens
SEQUENCE: 54
MGMACLTMTE MEGTSTSSIY QNGDISGNAN SMKQIDPVLQ VYLYHSLGKS EADYLTFPSG     60
EYVAEEICIA ASKACGITPV YHNMFALMSE TERIWYPPNH VFHIDESTRH NVLYIRIRFYF   120
PRWYCSGSNR AYRHGISRGA EAPLLDDFVM SYLFAQWRHD FVHGWIKVPV THETQEECLG   180
MAVLDMMRIA KENDQTPLAI YNSISYKTFL PKCIRAKIQD YHILTRKRIR YRFRRFIQQF   240
SQCKATARNL KLKYLINLET LQSAFYTEKF EVKEPGSGPS GEEIFATIII TGNGGIQWSR   300
GKHKESETLT EQDLQLYCDF PNIIDVSIKQ ANQEGSNESR VVTIHKQDGK NLEIELSSLR   360
EALSFVSLID GYYRLTADAH HYLCKEVAPP AVLENIQSNC HGPISMDFAI SKLKKAGNQT   420
GLYVLRCSPK DFNKYFLTFA VERENVIEYK HCLITKNENE EYNLSGTKKN FSSLKDLLNC   480
YQMETVRSDN IIFQFTKCCP PKPKDKSNLL VFRTNGVSDV PTSPTLQRPT HMNQMVFHKI   540
RNEDLIFNES LGQGTFTKIF KGVRREVGDY GQLHETEVLL KVLDKAHRNY SESFFEAASM   600
MSKLSHKHLV LNYGVCVCGD ENILVQEFVK FGSLDTYLKK NKNCININLWK LEVAKQLAWA   660
MHFLEENTLI HGNVCAKNIL LIREEDRKTG NPPFIKLSDP GISITVLPKD ILQERIPWVP   720
PECIENPKNL NLATDKWSFG TTLWEICSGG DKPLSALDSQ RKLQFYEDRH QLPAPKWAEL   780
ANLINNCMDY EPDFRPSFRA IIRDLNSLFT PDYELLTEND MLPNMRIGAL GFSGAFEDRD   840
PTQFEERHLK FLQQLGKGNF GSVEMCRYDP LQDNTGEVVA VKKLQHSTEE HLRDFEREIE   900
ILKSLQHDNI VKYKGVCYSA GRRNLKLIME YLPYGSLRDY LQKHKERIDH IKLLQYTSQI   960
CKGMEYLGTK RYIHRDLATR NILVENENRV KIGDFGLTKV LPQDKEYYKV KEPGESPIFW  1020
YAPESLTESK FSVASDVWSF GVVLYELFTY IEKSKSPPAE FMRMIGNDKQ GQMIVFHLIE  1080
LLKNNGRLPR PDGCPDEIYM IMTECWNNNV NQRPSFRDLA LRVDQIRDNM AG          1132

SEQ ID NO: 55           moltype = AA  length = 1124
FEATURE                 Location/Qualifiers
source                  1..1124
                        mol_type = protein
                        organism = Homo sapiens
SEQUENCE: 55
MAPPSEETPL IPQRSCSLLS TEAGALHVLL PARGPGPPQR LSFSFGDHLA EDLCVQAAKA     60
SGILPVYHSL FALATEDLSC WFPPSHIFSV EDASTQVLLY RIRFYFPNWF GLEKCHRFGL   120
RKDLASAILD LPVLEHLFAQ HRSDLVSGRL PVGLSLKEQG ECLSLAVLDL ARMAREQAQR   180
PGELLKTVSY KACLPPSLRD LIQGLSFVTR RRIRRTVRRA LRRVAACQAD RHSLMAKYIM   240
DLERLDPAGA AETFHVGLPG ALGGHDGLGL LRVAGDGLGL WTQGEQEVLQ PPFCDFPEIVD   300
ISIKQAPRVG PAGEHRLVTV TRTDNQILEA EFPGLPEALS FVALVDGYFR LTTDSQHFFC   360
KEVAPPRLLE EVAEQCHGPI TLDFAINKLK TGGSRPGSYV LRRSPQDFDS FLLTVCVQNP   420
LGPDYKGCLI RRSPTGTFLL VGLSRPHSSL RELLATCWDG GLHVDGVAVT LTSCCIPRPK   480
EKSNLIVVQR GHSPPTSSLV QPQSQYQLSQ MTFHKIPADS LEWHENLGHG SFTKIYRGCR   540
HEVVDGEARK TEVLLKVMDA KHKNCMESFL EAASLMSQVS YRHLVLLHGV CMAGDSTMVQ   600
EFVHLGAIDM YLRKRGHLVP ASWKLQVVKQ LAYALNYLED KGLPHGNVSA RKVLLAREGA   660
DGSPPFIKLS DPGVSPAVLS LEMLTDRIPW VAPECLREAQ TLSLEADKWG FGATVWEVFS   720
GVTMPISALD PAKKLQFYED RQQLPAPKWT ELALLIQQCM AYEPVQRPSF RAVIRDLNSL   780
ISSDYELLSD PTPGALAPRD GLWNGAQLYA CQDPTIFEER HLKYISQLGK GNFGSVELCR   840
YDPLGDNTGA LVAVKQLQHS GPDQQRDFQR EIQILKALHS DFIVKYRGVS YGPGRQSRL   900
VMEYLPSGCL RDFLQRHRAR LDASRLLLYS SQICKGMEYL GSRRCVHRDL AARNILVESE   960
AHVKIADFGL AKLLPDKDY YVVREPGQSP IFWYAPESLS DNIFSRQSDV WSFGVVLYEL  1020
FTYCDKSCSP SAEFLRMMGC ERDVPALCRL LELLEEGQRL PAPPACPAEV HELMKLCWAP  1080
SPQDRPSFSA LGPQLDMLWS GSRGCETHAF TAHPEGKHHS LSFS                   1124

SEQ ID NO: 56           moltype = AA  length = 1187
FEATURE                 Location/Qualifiers
source                  1..1187
                        mol_type = protein
                        organism = Homo sapiens
SEQUENCE: 56
MPLRHWGMAR GSKPVGDGAQ PMAAMGGLKV LLHWAGPGGG EPWVTFSESS LTAEEVCIHI     60
AHKVGITPPC FNLFALFDAQ AQVWLPPNHI LEIPRDASLM LYFRIRFYFR NWHGMNPREP   120
AVYRCGPPGT EASSDQTAQG MQLLDPASFE YLFEQGKHEF VNDVASLWEL STEEEIHHFK   180
NESLGMAFLH LCHLALRHGI PLEEVAKKTS FKDCIPRSFR RHIRQHSALT RLRLRNVFRR   240
FLRDFQPGRL SQQMVMVKYL ATLERLAPRF GTERVPVCHL RLLAQAEGEP CYIRDSGVAP   300
TDPGPESAAG PPTHEVLVTG TGGIQWWPVE EEVNKEEGSS GSSGRNPQAS LFGKKAKAHK   360
AVGQPADRPR EPLWAYFCDF RDITHVVLKE HCVSIHRQDN KCLELSLPSR AAALSFVSLV   420
DGYFRLTADS SHYLCHEVAP PRLVMSIRDG IHGPLLEPPV QAKLRPEDGL YLIHWSTSHP   480
YRLILTVAQR SQAPDGMQSL RLRKFPIEQQ DGAFVLEGWG RSFPSVRELG AALQGCLLRA   540
GDDCFSLRRC CLPQPGETSN LIIMRGARAS PRTLNLSQLS FHRVDQKEIT QLSHLGQGTR   600
TNVYEGRLRV EGSGDPEEGK MDDEDPLVPG RDRGQELRVV LKVVLDPSHHD IALAFYETAS   660
```

```
LMSQVSHTHL AFVHGVCVRG PENIMVTEYV EHGPLDVWLR RERGHVPMAW KMVVAQQLAS    720
ALSYLENKNL VHGNVCGRNI LLARLGLAEG TSPFIKLSDP GVGLGALSRE ERVERIPWLA    780
PECLPGGANS LSTAMDKWGF GATLLEICFD GEAPLQSRSP SEKEHFYQRQ HRLPEPSCPQ    840
LATLTSQCLT YEPTQRPSFR TILRDLTRLQ PHNLADVLTV NPDSPASDPT VFHKRYLKKI    900
RDLGEGHFGK VSLYCYDPTN DGTGEMVAVK ALKADCGPQH RSGWKQEIDI LRTLYHEHII    960
KYKGCCEDQG EKSLQLVMEY VPLGSLRDYL PRHSIGLAQL LLFAQQICEG MAYLHAQHYI   1020
HRDLAARNVL LDNDRLVKIG DFGLAKAVPE GHEYYRVRED GDSPVFWYAP ECLKEYKFYY   1080
ASDVWSFGVT LYELLTHCDS SQSPPTKFLE LIGIAQGQMT VLRLTELLER GERLPRPDKC   1140
PCEVYHLMKN CWETEASFRP TFENLIPILK TVHEKYQGQA PSVFSVC                1187

SEQ ID NO: 57           moltype = AA  length = 906
FEATURE                 Location/Qualifiers
source                  1..906
                        mol_type = protein
                        organism = Homo sapiens
SEQUENCE: 57
MAGNVKKSSG AGGGSGSGGS GSGGLIGLMK DAFQPHHHHH HHLSPHPPGT VDKKMVEKCW     60
KLMDKVVRLC QNPKLALKNS PPYILDLLPD TYQHLRTILS RYEGKMETLG ENEYFRVFME    120
NLMKKTKQTI SLFKEGKERM YEENSQPRRN LTKLSLIFSH MLAELKGIFP SGLFQGDTFR    180
ITKADAAEFW RKAFGEKTIV PWKSFRQALH EVHPISSGLE AMALKSTIDL TCNDYISVFE    240
FDIFTRLFQP WSSLLRNWNS LAVTHPGYMA FLTYDEVKAR LQKFIHKPGS YIFRLSCTRL    300
GQWAIGYVTA DGNILQTIPH NKPLFQALID GFREGFYLFP DGRNQPNDLT GLCEPTPQDH    360
IKVTQEQYEL YCEMGSTFQL CKICAENDKD VKIEPCGHLM CTSCLTSWQE SEGQGCPFCR    420
CEIKGTEPIV VDPFDPRGSG SLLRQGAEGA PSPNYDDDDD ERADDTLFMM KELAGAKVER    480
PPSPFSMAPQ ASLPPVPPRL DLLPQRVCVP SSASALGTAS KAASGSLHKD KPLPVPPTLR    540
DLPPPPPPDR PYSVGAESRP QRRPLPCTPG DCPSRDKLPP VPSSRLGDSW LPRPIPKVPV    600
SAPSSSDPWT GRELTNRHSL PFSLPSQMEP RPDVPRLGST FSLDTSMSMN SSPLVGPECD    660
HPKIKPSSSA NAIYSLAARP LPVPKLPPGE QCEGEEDTEY MTPSSRPLRP LDTSQSSRAC    720
DCDQQQIDSCT YEAMYNIQSQ APSITESSTF GEGNLAAAHA NTGPEESENE DDGYDVPKPP    780
VPAVLARRTL SDISNASSSF GWLSLDGDPT TNVTEGSQVP ERPPKPFPRR INSERKAGSC    840
QQGSGPAASA ATASPQLSSE IENLMSQGYS YQDIQKALVI AQNNIEMAKN ILREFVSISS    900
PAHVAT                                                              906

SEQ ID NO: 58           moltype = AA  length = 465
FEATURE                 Location/Qualifiers
source                  1..465
                        mol_type = protein
                        organism = Homo sapiens
SEQUENCE: 58
MIVFVRFNSS HGFPVEVDSD TSIFQLKEVV AKRQGVPADQ LRVIFAGKEL RNDWTVQNCD     60
LDQQSIVHIV QRPWRKGQEM NATGGDDPRN AAGGCEREPQ SLTRVDLSSS VLPGDSVGLA    120
VILHTDSRKD SPPAGSPAGR SIYNSFYVYC KGPCQRVQPG KLRVQCSTCR QATLTLTQGP    180
SCWDDVLIPN RMSGECQSPH CPGTSAEFFF KCGAHPTSDL ETSVALHLIA TNSRNITCIT    240
CTDVRSPVLV FQCNSRHVIC LDCFHLYCVT RLNDRQFVHD PQLGYSLPCV AGCPNSLIKE    300
LHHFRILGEE QYNRYQQYGA EECVLQMGGV LCPRPGCGAG LLPEPDQRKV TCEGGNGLGC    360
GFAFCRECKE AYHEGECSAV FEASGTTTQA YRVDERAAEQ ARWEAASKET IKKTTKPCPR    420
CHVPVEKNGG CMHMKCPQPQ CRLEWCWNCG CEWNRVCMGD HWFDV                   465

SEQ ID NO: 59           moltype = AA  length = 108
FEATURE                 Location/Qualifiers
source                  1..108
                        mol_type = protein
                        organism = Homo sapiens
SEQUENCE: 59
MAAAMDVDTP SGTNSGAGKK RFEVKKWNAV ALWAWDIVVD NCAICRNHIM DLCIECQANQ     60
ASATSEECTV AWGVCNHAFH FHCISRWLKT RQVCPLDNRE WEFQKYGH                108

SEQ ID NO: 60           moltype = AA  length = 501
FEATURE                 Location/Qualifiers
source                  1..501
                        mol_type = protein
                        organism = Homo sapiens
SEQUENCE: 60
MAAASVTPPG SLELLQPGFS KTLLGTKLEA KYLCSACRNV LRRPFQAQCG HRYCSFCLAS     60
ILSSGPQNCA ACVHEGIYEE GISILESSSA FPDNAARREV ESLPAVCPSD GCTWKGTLKE    120
YESCHEGRCP LMLTECPACK GLVRLGEKER HLEHECPERS LSCRHCRAPC CGADVKAHHE    180
VCPKFPLTCD GCGKKKIPRE KFQDHVKTCG KCRVPCRFHA IGCLETVEGE KQQEHEVQWL    240
REHLAMLLSS VLEAKPLLGD QSHAGSELLQ RCESLEKKTA TFENIVCVLN REVERVAMTA    300
EACSRQHRLD QDKIEALSSK VQQLERSIGL KDLAMADLEQ KVLEMEASTY DGVFIWKISD    360
FARKRQEAVA GRIPAIFSPA FYTSRYGYKM CLRIYLNGDG TGRGTHLSLF FVVMKGPNDA    420
LLRWPFNQKV TLMLLDQNNR EHVIDAFRPD VTSSSFQRPV NDMNIASGCP LFCPVSKMEA    480
KNSYVRDDAI FIKAIVDLTG L                                             501

SEQ ID NO: 61           moltype = AA  length = 491
FEATURE                 Location/Qualifiers
source                  1..491
                        mol_type = protein
                        organism = Homo sapiens
SEQUENCE: 61
```

```
MCNTNMSVPT DGAVTTSQIP ASEQETLVRP KPLLLKLLKS VGAQKDTYTM KEVLFYLGQY    60
IMTKRLYDEK QQHIVYCSND LLGDLFGVPS FSVKEHRKIY TMIYRNLVVV NQQESSDSGT   120
SVSENRCHLE GGSDQKDLVQ ELQEEKPSSS HLVSRPSTSS RRRAISETEE NSDELSGERQ   180
RKRHKSDSIS LSFDESLALC VIREICCERS SSSESTGTPS NPDLDAGVSE HSGDWLDQDS   240
VSDQFSVEFE VESLDSEDYS LSEEGQELSD EDDEVYQVTV YQAGESDTDS FEEDPEISLA   300
DYWKCTSCNE MNPPLPSHCN RCWALRENWL PEDKGKDKGE ISEKAKLENS TQAEEGFDVP   360
DCKKTIVNDS RESCVEENDD KITQASQSQE SEDYSQPSTS SSIIYSSQED VKEFEREETQ   420
DKEESVESSL PLNAIEPCVI CQGRPKNGCI VHGKTGHLMA CFTCAKKLKK RNKPCPVCRQ   480
PIQMIVLTYF P                                                       491

SEQ ID NO: 62          moltype = AA  length = 240
FEATURE                Location/Qualifiers
source                 1..240
                       mol_type = protein
                       organism = Renilla reniformis
SEQUENCE: 62
MTSKVYDPEQ RKRMITGPQW WARCKQMNVL DSFINYYDSE KHAENAVIFL HGNAASSYLW    60
RHVVPHIEPV ARCIIPDLIG MGKSGKSGNG SYRLLDHYKY LTAWFELLNL PKKIIFVGHD   120
WGACLAFHYS YEHQDKIKAI VHAESVVDVI ESWDEWPDIE EDIALIKSEE GEKMVLENNF   180
FVETMLPSKI MRKLEPEEFA AYLEPFKEKG EVRRPTLSWP REIPLVKGGK PDVVQIVRNY   240

SEQ ID NO: 63          moltype = AA  length = 320
FEATURE                Location/Qualifiers
source                 1..320
                       mol_type = protein
                       organism = Homo sapiens
SEQUENCE: 63
MELLSPPLRD VDLTAPDGSL CSFATTDDFY DDPCFDSPDL RFFEDLDPRL MHVGALLKPE    60
EHSHFPAAVH PAPGAREDEH VRAPSGHHQA GRCLLWACKA CKRKTTNADR RKAATMRERR   120
RLSKVNEAFE TLKRCTSSNP NQRLPKVEIL RNAIRYIEGL QALLRDQDAA PPGAAAAFYA   180
PGPLPPGRGG EHYSGDSDAS SPRSNCSDGM MDYSGPPSGA RRRNCYEGAY YNEAPSEPRP   240
GKSAAVSSLD CLSSIVERIS TESPAAPALL LADVPSESPP RRQEAAAPSE GESSGDPTQS   300
PDAAPQCPAG ANPNPIYQVL                                              320

SEQ ID NO: 64          moltype = AA  length = 607
FEATURE                Location/Qualifiers
source                 1..607
                       mol_type = protein
                       organism = Homo sapiens
SEQUENCE: 64
MAEKRRGSPC SMLSLKAHAF SVEALIGAEK QQQLQKKRRK LGAEEAAGAV DDGGCSRGGG    60
AGEKGSSEGD EGAALPPPAG ATSGPARSGA DLERGAAGGC EDGFQQGASP LASPGGSPKG   120
SPARSLARPG TPLPSPQAPR VDLQGAELWK RFHEIGTEMI ITKAGRRMFP AMRVKISGLD   180
PHQQYYIAMD IVPVDNKRYR YVYHSSKWMV AGNADSPVPP RVYIHPDSPA SGETWMRQVI   240
SFDKLKLTNN ELDDQGHIIL HSMHKYQPRV HVIRKDCGDD LSPIKPVPSG EGVKAFSFPE   300
TVFTTVTAYQ NQQITRLKID RNPFAKGFRD SGRNRMGLEA LVESYAFWRP SLRTLTFEDI   360
PGIPKQGNAS SSTLLQGTGN GVPATHPHLL SGSSCSSPAF HLGPNTSQLC SLAPADYSAC   420
ARSGLTLNRY STSLAETYNR LTNQAGETFA PPRTPSYVGV SSSTSVNMSM GGTDGDTFSC   480
PQTSLSMQIS GMSPQLQYIM PSPSSNAFAT NQTHQGSYNT FRLHSPCALY GYNFSTSPKL   540
AASPEKIVSS QGSFLGSSPS GTMTDRQMLP PVEGVHLLSS GGQQSFFDSR TLGSLTLSSS   600
QVSAHMV                                                            607

SEQ ID NO: 65          moltype = AA  length = 393
FEATURE                Location/Qualifiers
source                 1..393
                       mol_type = protein
                       organism = Homo sapiens
SEQUENCE: 65
MEEPQSDPSV EPPLSQETFS DLWKLLPENN VLSPLPSQAM DDLMLSPDDI EQWFTEDPGP    60
DEAPRMPEAA PPVAPAPAAP TPAAPAPAPS WPLSSSVPSQ KTYQGSYGFR LGFLHSGTAK   120
SVTCTYSPAL NKMFCQLAKT CPVQLWVDST PPPGTRVRAM AIYKQSQHMT EVVRRCPHHE   180
RCSDSDGLAP PQHLIRVEGN LRVEYLDDRN TFRHSVVVPY EPPEVGSDCT TIHYNYMCNS   240
SCMGGMNRRP ILTIITLEDS SGNLLGRNSF EVRVCACPGR DRRTEEENLR KKGEPHHELP   300
PGSTKRALPN NTSSSPQPKK KPLDGEYFTL QIRGRERFEM FRELNEALEL KDAQAGKEPG   360
GSRAHSSHLK SKKGQSTSRH KKLMFKTEGP DSD                                393

SEQ ID NO: 66          moltype = AA  length = 215
FEATURE                Location/Qualifiers
source                 1..215
                       mol_type = protein
                       organism = Homo sapiens
SEQUENCE: 66
MGKGDPKKPR GKMSSYAFFV QTCREEHKKK HPDASVNFSE FSKKCSERWK TMSAKEKGKF    60
EDMAKADKAR YEREMKTYIP PKGETKKKFK DPNAPKRPPS AFFLFCSEYR PKIKGEHPGL   120
SIGDVAKKLG EMWNNTAADD KQPYEKKAAK LKEKYEKDIA AYRAKGKPDA AKKGVVKAEK   180
SKKKKEEEED EDEEDEEEE EDEEDEDEEE DDDDE                              215

SEQ ID NO: 67          moltype = AA  length = 356
FEATURE                Location/Qualifiers
```

```
source                         1..356
                               mol_type = protein
                               organism = Homo sapiens
SEQUENCE: 67
MTKSYSESGL MGEPQPQGPP SWTDECLSSQ DEEHEADKKE DDLETMNAEE DSLRNGGEEE     60
DEDEDLEEEE EEEEEDDDQK PKRRGPKKKK MTKARLERFK LRRMKANARE RNRMHGLNAA    120
LDNLRKVVPC YSKTQKLSKI ETLRLAKNYI WALSEILRSG KSPDLVSFVQ TLCKGLSQPT    180
TNLVAGCLQL NPRTFLPEQN QDMPPHLPTA SASFPVHPYS YQSPGLPSPP YGTMDSSHVF    240
HVKPPPHAYS AALEPFFESP LTDCTSPSFD GPLSPPLSIN GNFSFKHEPS AEFEKNYAFT    300
MHYPAATLAG AQSHGSIFSG TAAPRCEIPI DNIMSFDSHS HHERVMSAQL NAIFHD        356

SEQ ID NO: 68                  moltype = AA   length = 498
FEATURE                        Location/Qualifiers
source                         1..498
                               mol_type = protein
                               organism = Homo sapiens
SEQUENCE: 68
MNQSIPVAPT PPRRVRLKPW LVAQVNSCQY PGLQWVNGEK KLFCIPWRHA TRHGPSQDGD     60
NTIFKAWAKE TGKYTEGVDE ADPAKWKANL RCALNKSRDF RLIYDGPRDM PPQPYKIYEV    120
CSNGPAPTDS QPPEDYSFGA GEEEEEEEEL QRMLPSLSLT EDVKWPPTLQ PPTLRPPTLQ    180
PPTLQPPVVL GPPAPDPSPL APPPGNPAGF RELLSEVLEP GPLPASLPPA GEQLLPDLLI    240
SPHMLPLTDL EIKFQYRGRP PRALTISNPH GCRLFYSQLE ATQEQVELFG PISLEQVRFP    300
SPEDIPSDKQ RFYTNQLLDV LDRGLILQLQ GQDLYAIRLC QCKVFWSGPC ASAHDSCPNP    360
IQREVKTKLF SLEHFLNELI LFQKGQTNTP PPFEIFFCFG EEWPDRKPRE KKLITVQVVP    420
VAARLLLEMF SGELSWSADS IRLQISNPDL KDRMVEQFKE LHHIWQSQQR LQPVAQAPPG    480
AGLGVGQGPW PMHPAGMQ                                                 498

SEQ ID NO: 69                  moltype = AA   length = 427
FEATURE                        Location/Qualifiers
source                         1..427
                               mol_type = protein
                               organism = Homo sapiens
SEQUENCE: 69
MGTPKPRILP WLVSQLDLGQ LEGVAWVNKS RTRFRIPWKH GLRQDAQQED FGIFQAWAEA     60
TGAYVPGRDK PDLPTWKRNF RSALNRKEGL RLAEDRSKDP HDPHKIYEFV NSGVGDFSQP    120
DTSPDTNGGG STSDTQEDIL DELLGNMVLA PLPDPGPPSL AVAPEPCQP LRSPSLDNPT     180
PFPNLGPSEN PLKRLLVPGE EWEFEVTAFY RGRQVFQQTI SCPEGLRLVG SEVGDRTLPG    240
WPVTLPDPGM SLTDRGVMSY VRHVLSCLGG GLALWRAGQW LWAQRLGHCH TYWAVSEELL    300
PNSGHGPDGE VPKDKEGGVF DLGPFIVDLI TFTEGSGRSP RYALWFCVGE SWPQDQPWTK    360
RLVMVKVVPT CLRALVEMAR VGGASSLENT VDLHISNSHP LSLTSDQYKA YLQDLVEGMD    420
FQGPGES                                                             427

SEQ ID NO: 70                  moltype = AA   length = 750
FEATURE                        Location/Qualifiers
source                         1..750
                               mol_type = protein
                               organism = Homo sapiens
SEQUENCE: 70
MSQWYELQQL DSKFLEQVHQ LYDDSFPMEI RQYLAQWLEK QDWEHAANDV SFATIRFHDL     60
LSQLDDQYSR FSLENNFLLQ HNIRKSKRNL QDNFQEDPIQ MSMIIYSCLK EERKILENAQ    120
RFNQAQSGNI QSTVMLDKQK ELDSKVRNVK DKVMCIEHEI KSLEDLQDEY DFKCKTLQNR    180
EHETNGVAKS DQKQEQLLLK KMYLMLDNKR KEVVHKIIEL LNVTELTQNA LINDELVEWK    240
RRQQSACIGG PPNACLDQLQ NWFTIVAESL QQVRQQLKKL EELELEQKYTYE HDPITKNKQV  300
LWDRTFSLFQ QLIQSSFVVE RQPCMPTHPQ RPLVLKTGVQ FTVKLRLLVK LQELNYNLKV    360
KVLFPLDVNE RNTVKGFRKF NILGTHTKVM NMEESTNGSL AAEFRHLQLK EQKNAGTRTN    420
EGPLIVTEEL HSLSFETQLC QPGLVIDLET TSLPVVVISN VSQLPSGWAS ILWYNMLVAE    480
PRNLSFFLTP PCARWAQLSE VLSWQFSSVT KRGLNVDQLN MLGEKLLGPN ASPDGLIPWT    540
RFCKENINDK NFPFWLWIES ILELIKKHLL PLWNDGCIMG FISKEREREAL LKDQQPGTFL   600
LRFSESSREG AITFTWVERS QNGGEPDFHA VEPYTKKELS AVTFPDIIRN YKVMAAENIP    660
ENPLKYLYPN IDKDHAFGKY YSRPKEAPEP MELDGPKGTG YIKTELISVS EVHPSRLQTT    720
DNLLPMSPEE FDEVSRIVGS VEFDSMMNTV                                    750

SEQ ID NO: 71                  moltype = AA   length = 225
FEATURE                        Location/Qualifiers
source                         1..225
                               mol_type = protein
                               organism = Homo sapiens
SEQUENCE: 71
MVTHSKFPAA GMSRPLDTSL RLKTFSSKSE YQLVVNAVRK LQESGFYWSA VTGGEANLLL     60
SAEPAGTFLI RDSSDRHFF TLSVKTQSGT KNLRIQCEGG SFSLQSDPRS TQPVPRFDCV     120
LKLVHHYMPP PGAPSFPSPP TEPSSEVPEQ PSAQPLPGSP PRRAYYIYSG GEKIPLVLSR    180
PLSSNVATLQ HLCRKTVNGH LDSYEKVTQL PGPIREFLDQ YDAPL                   225

SEQ ID NO: 72                  moltype = AA   length = 770
FEATURE                        Location/Qualifiers
source                         1..770
                               mol_type = protein
                               organism = Homo sapiens
SEQUENCE: 72
```

```
MAQWNQLQQL DTRYLEQLHQ LYSDSFPMEL RQFLAPWIES QDWAYAASKE SHATLVFHNL    60
LGEIDQQYSR FLQESNVLYQ HNLRRIKQFL QSRYLEKPME IARIVARCLW EESRLLQTAA   120
TAAQQGGQAN HPTAAVVTEK QQMLEQHLQD VRKRVQDLEQ KMKVVENLQD DFDFNYKTLK   180
SQGDMQDLNG NNQSVTRQKM QQLEQMLTAL DQMRRSIVSE LAGLLSAMEY VQKTLTDEEL   240
ADWKRRQQIA CIGGPPNICL DRLENWITSL AESQLQTRQQ IKKLEELQQK VSYKGDPIVQ   300
HRPMLEERIV ELFRNLMKSA FVVERQPCMP MHPDRPLVIK TGVQFTTKVR LLVKFPELNY   360
QLKIKVCIDK DSGDVAALRG SRKFNILGTN TKVMNMEESN NGSLSAEFKH LTLREQRCGN   420
GGRANCDASL IVTEELHLIT FETEVYHQGL KIDLETHSLP VVVISNICQM PNAWASILWY   480
NMLTNNPKNV NFFTKPPIGT WDQVAEVLSW QFSSTTKRGL SIEQLTTLAE KLLGPGVNYS   540
GCQITWAKFC KENMAGKGFS FWVLDNIID LVKKYILALW NEGYIMGFIS KERERAILST   600
KPPGTFLLRF SESSKEGGVT FTWVEKDISG KTQIQSVEPY TKQQLNNMSF AEIIMGYKIM   660
DATNILVSPL VYLYPDIPKE EAFGKYCRPE SQEHPEADPG SAAPYLKTKF ICVTPTTCSN   720
TIDLPMSPRT LDSLMQFGNN GEGAEPSAGG QFESLTFDME LTSECATSPM              770

SEQ ID NO: 73           moltype = AA   length = 246
FEATURE                 Location/Qualifiers
source                  1..246
                        mol_type = protein
                        organism = Homo sapiens
SEQUENCE: 73
MELVLTQTPS PVSAVVGGTV TINCQSSQSV WGNNRLSWYQ QKPGQPPRLL MYYASNLASG    60
VSSRFKGSGS GTQFTLTISD VQCDDAATYY CQGGFECSGG DCVGFGGGTE LEILGGSSRS   120
SSSGGGGSGG GGQSVEESGG RLVAPGGSLT LTCTVSGIDL SSDAMSWVRQ APGKGLEWIG   180
TIYGSAGTYY ATWAKGRFTI SKTSTTVDLK MTSLTTEDTA TYFCTRAFSN TRLDLWGQGT   240
LVTISS                                                              246

SEQ ID NO: 74           moltype = AA   length = 233
FEATURE                 Location/Qualifiers
source                  1..233
                        mol_type = protein
                        organism = Homo sapiens
SEQUENCE: 74
MSQSNRELVV DFLSYKLSQK GYSWSQFSDV EENRTEAPEG TESEMETPSA INGNPSWHLA    60
DSPAVNGATG HSSSLDAREV IPMAAVKQAL REAGDEFELR YRRAFSDLTS QLHITPGTAY   120
QSFEQVVNEL FRDGVNWGRI VAFFSFGGAL CVESVDKEMQ VLVSRIAAWM ATYLNDHLEP   180
WIQENGGWDT FVELYGNNAA AESRKGQERF NRWFLTGMTV AGVVLLGSLF SRK          233

SEQ ID NO: 75           moltype = AA   length = 312
FEATURE                 Location/Qualifiers
source                  1..312
                        mol_type = protein
                        organism = Homo sapiens
SEQUENCE: 75
MANNDAVLKR LEQKGAEADQ IIEYLKQQVS LLKEKAILQA TLREEKKLRV ENAKLKKEIE    60
ELKQELIQAE IQNGVKQIPF PSGTPLHANS MVSENVIQST AVTTVSSGTK EQIKGGTGDE   120
KKAKEKIEKK GEKKEKKQQS IAGSADSKPI DVSRLDLRIG CIITARKHPD ADSLYVEEVD   180
VGEIAPRTVV SGLVNHVPLE QMQNRMVILL CNLKPAKMRG VLSQAMVMCA SSPEKIEILA   240
PPNGSVPGDR ITFDAFPGEP DKELNPKKKI WEQIQPDLHT NDECVATYKG VPFEVKGKGV   300
CRAQTMSNSG IK                                                       312

SEQ ID NO: 76           moltype = AA   length = 320
FEATURE                 Location/Qualifiers
source                  1..320
                        mol_type = protein
                        organism = Homo sapiens
SEQUENCE: 76
MPMYQVKPYH GGGAPLRVEL PTCMYRLPNV HGRSYGPAPG AGHVQEESNL SLQALESRQD    60
DILKRLYELK AAVDGLSKMI QTPDADLDVT NIIQADEPTT LTTNALDLNS VLGKDYGALK   120
DIVINANPAS PPLSLLVLHR LLCEHFRVLS TVHTHSSVKS VPENLLKCFG EQNKKQPRQD   180
YQLGFTLIWK NVPKTQMKFS IQTMCPIEGE GNIARFLFSL FGQKHNAVNA TLIDSWVDIA   240
IFQLKEGSSK EKAAVFRSMN SALGKSPWLA GNELTVADVV LWSVLQQIGG CSVTVPANVQ   300
RWMRSCENLA PFNTALKLLK                                               320

SEQ ID NO: 77           moltype = AA   length = 233
FEATURE                 Location/Qualifiers
source                  1..233
                        mol_type = protein
                        organism = Homo sapiens
SEQUENCE: 77
MVSKGEEDNM AIIKEFMRFK VHMEGSVNGH EFEIEGEGEG RPYEGTQTAK LKVTKGGPLP    60
FAWDILSPQF MYGSKAYVKH PADIPDYLKL SFPEGFKWER VMNFEDGGVV TVTQDSSLQD   120
GEFIYKVKLR GTNFPSDGPV MQKKTMGWEA SSERMYPEDG ALKGEIKQRL KLKDGGHYDA   180
EVKTTYKAKK PVQLPGAYNV NIKLDITSHN EDYTIVEQYE RAEGRHSTGG MDE          233

SEQ ID NO: 78           moltype = AA   length = 267
FEATURE                 Location/Qualifiers
source                  1..267
                        mol_type = protein
                        organism = Homo sapiens
```

```
SEQUENCE: 78
MVSKGEELFT GVVPILVELD GDVNGHKFSV SGEGEGDATY GKLTLKFICT TGKLPVPWPT      60
LVTTLTYGVQ CFSRYPDHMK QHDFFKSAMP EGYVQERTIF FKDDGNYKTR AEVKFEGDTL    120
VNRIELKGID FKEDGNILGH KLEYNYNSHN VYIMADKQKN GIKVNFKIRH NIEDGSVQLA    180
DHYQQNTPIG DGPVLLPDNH YLSTQSALSK DPNEKRDHMV LLEFVTAAGI TLGMDELYKG    240
SGSGLRSRAQ ASNSAVDGTA GPGSTGS                                        267

SEQ ID NO: 79           moltype = AA  length = 425
FEATURE                 Location/Qualifiers
source                  1..425
                        mol_type = protein
                        organism = Homo sapiens
SEQUENCE: 79
MADKEAAFDD AVEERVINEE YKIWKKNTPF LYDLVMTHAL EWPSLTAQWL PDVTRPEGKD      60
FSIHRLVLGT HTSDEQNHLV IASVQLPNDD AQFDASHYDS EKGEFGGFGS VSGKIEIEIK    120
INHEGEVNRA RYMPQNPCII ATKTPSSDVL VFDYTKHPSK PDPSGECNPD LRLRGHQKEG    180
YGLSWNPNLS GHLLSASDDH TICLWDISAV PKEGKVVDAK TIFTGHTAVV EDVSWHLLHE    240
SLFGSVADDQ KLMIWDTRSN NTSKPSHSVD AHTAEVNCLS FNPYSEFILA TGSADKTVAL    300
WDLRNLKLKL HSFESHKDEI FQVQWSPHNE TILASSGTDR RLNVWDLSKI GEEQSPEDAE    360
DGPPELLFIH GGHTAKISDF SWNPNEPWVI CSVSEDNIMQ VWQMAENIYN DEDPEGSVDP    420
EGQGS                                                                 425

SEQ ID NO: 80           moltype = AA  length = 375
FEATURE                 Location/Qualifiers
source                  1..375
                        mol_type = protein
                        organism = Homo sapiens
SEQUENCE: 80
MADHSFSDGV PSDSVEAAKN ASNTEKLTDQ VMQNPRVLAA LQERLDNVPH TPSSYIETLP      60
KAVKRRINAL KQLQVRCAHI EAKFYEEVHD LERKYAALYQ PLFDKRREFI TGDVEPTDAE    120
SEWHSENEEE EKLAGDMKSK VVVTEKAAAT AEEPDPKGIP EFWFTIFRNV DMLSELVQEY    180
DEPILKHLQD IKVKFSDPGQ PMSFVLEFHF EPNDYFTNSV LTKTYKMKSE PDKADPFSFE    240
GPEIVDCDGC TIDWKKGKNV TVKTIKKKQK HKGRGTVRTI TKQVPNESFF NFFNPLKASG    300
DGESLDEDSE FTLASDFEIG HFFRERIVPR AVLYFTGEAI EDDDNFEEGE EGEEEELEGD    360
EEGEDEDDAE INPKV                                                     375

SEQ ID NO: 81           moltype = AA  length = 1132
FEATURE                 Location/Qualifiers
source                  1..1132
                        mol_type = protein
                        organism = Homo sapiens
SEQUENCE: 81
MPRAPRCRAV RSLLRSHYRE VLPLATFVRR LGPQGWRLVQ RGDPAAFRAL VAQCLVCVPW      60
DARPPPAAPS FRQVSCLKEL VARVLQRLCE RGAKNVLAFG FALLDGARGG PPEAFTTSVR    120
SYLPNTVTDA LRGSGAWGLL LRRVGDDVLV HLLARCALFV LVAPSCAYQV CGPPLYQLGA    180
ATQARPPPHA SGPRRRLGCE RAWNHSVREA GVPLGLPAPG ARRRGGSASR SLPLPKRPRR    240
GAAPEPERTP VGQGSWAHPG RTRGPSDRGF CVVSPARPAE EATSLEGALS GTRHSHPSVG    300
RQHHAGPPST SRPPRPWDTP CPPVYAETKH FLYSSGDKEQ LRPSFLLSSL RPSLTGARRL    360
VETIFLGSRP WMPGTPRRLP RLPQRYWQMR PLFLELLGNH AQCPYGVLLK THCPLRAAVT    420
PAAGVCAREK PQGSVAAPEE EDTDPRRLVQ LLRQHSSPWQ VYGFVRACLR RLVPPGLWGS    480
RHNERRFLRN TKKFISLGKH AKLSLQELTW KMSVRDCAWL RRSPGVGCVP AAEHRLREEI    540
LAKFLHWLMS VYVVELLRSF FYVTETTFQK NRLFFYRKSV WSKLQSIGIR QHLKRVQLRE    600
LSEAEVRQHR EARPALLTSR LRFIPKPDGL RPIVNMDYVV GARTFRREKR AERLTSRVKA    660
LFSVLNYERA RRPGLLGASV LGLDDIHRAW RTFVLRVRAQ DPPPELYFVK VDVTGAYDTI    720
PQDRLTEVIA SIIKPQNTYC VRRYAVVQKA AHGHVRKAFK SHVSTLTDLQ PYMRQFVAHL    780
QETSPLRDAV VIEQSSSLNE ASSGLFDVFL RFMCHHAVRI RGKSYVQCQG IPQGSILSTL    840
LCSLCYGDME NKLFAGIRRD GLLLRLVDDF LLVTPHLTHA KTFLRTLVRG VPEYGCVVNL    900
RKTVVNFPVE DEALGGTAFV QMPAHGLFPW CGLLLDTRTL EVQSDYSSYA RTSIRASLTF    960
NRGFKAGRNM RRKLFGVLRL KCHSLFLDLQ VNSLQTVCTN IYKILLLQAY RPHACVLQLP   1020
FHQQVWKNPT FFLRVISDTA SLCYSILKAK NAGMSLGAKG AAGPLPSEAV QWLCHQAFLL   1080
KLTRHRVTYV PLLGSLRTAQ TQLSRKLPGT TLTALEAAAN PALPSDFKTI LD           1132

SEQ ID NO: 82           moltype = AA  length = 462
FEATURE                 Location/Qualifiers
source                  1..462
                        mol_type = protein
                        organism = Homo sapiens
SEQUENCE: 82
METEQPEETF PNTETNGEFG KRPAEDMEEE QAFKRSRNTD EMVELRILLQ SKNAGAVIGK      60
GGKNIKALRT DYNASVSVPD SSGPERILSI SADIETIGEI LKKIIPTLEE GLQLPSPTAT    120
SQLPLESDAV ECLNYQHYKG SDFDCELRLL IHQSLAGGII GVKGAKIKEL RENTQTTIKL    180
FQECCPHSTD RVVLIGGKPD RVVECIKIIL DLISESPIKG RAQPYDPNFY DETYDYGGFT    240
MMFDDRRGRP VGFPMRGRGG FDRMPPGRGG RPMPPSRRDY DDMSPRRGRP PPPPGRGGRG    300
GSRARNLPLP PPPPPRGGDL MAYDRRGRPG DRYDGMVGFS ADETWDSAID TWSPSEWQMA    360
YEPQGGSGYD YSYAGGRGSY GDLGGPIITT QVTIPKDLAG SIIGKGGQRI KQIRHESGAS    420
IKIDEPLEGS EDRIITITGT QDQIQNAQYL LQNSVKQYSG KF                       462

SEQ ID NO: 83           moltype = AA  length = 745
FEATURE                 Location/Qualifiers
```

```
source               1..745
                     mol_type = protein
                     organism = Homo sapiens
SEQUENCE: 83
MERPPGLRPG AGGPWEMRER LGTGGFGNVC LYQHRELDLK IAIKSCRLEL STKNRERWCH   60
EIQIMKKLNH ANVVKACDVP EELNILIHDV PLLAMEYCSG GDLRKLLNKP ENCCGLKESQ  120
ILSLLSDIGS GIRYLHENKI IHRDLKPENI VLQDVGGKII HKIIDLGYAK DVDQGSLCTS  180
FVGTLQYLAP ELFENKPYTA TVDYWSFGTM VFECIAGYRP FLHHLQPFTW HEKIKKKDPK  240
CIFACEEMSG EVRFSSHLPQ PNSLCSLVVE PMENWLQLML NWDPQQRGGP VDLTLKQPRC  300
FVLMDHILNL KIVHILNMTS AKIISFLLPP DESLHSLQSR IERETGINTG SQELLSETGI  360
SLDPRKPASQ CVLDGVRGCD SYMVYLFDKS KTVYEGPFAS RSLSDCVNYI VQDSKIQLPI  420
IQLRKVWAEA VHYVSGLKED YSRLFQGQRA AMLSLLRYNA NLTKMKNTLI SASQQLKAKL  480
EFFHKSIQLD LERYSEQMTY GISSEKMLKA WKEMEEKAIH YAEVGVIGYL EDQIMSLHAE  540
IMELQKSPYG RRQGDLMESL EQRAIDLYKQ LKHRPSDHSY SDSTEMVKII VHTVQSQDRV  600
LKELFGHLSK LLGCKQKIID LLPKVEVALS NIKEADNTVM FMQGKRQKEI WHLLKIACTQ  660
SSARSLVGSS LEGAVTPQTS AWLPPTSAEH DHSLSCVVTP QDGETSAQMI EENLNCLGHL  720
STIIHEANEE QGNSMMNLDW SWLTE                                       745

SEQ ID NO: 84        moltype = AA  length = 968
FEATURE              Location/Qualifiers
source               1..968
                     mol_type = protein
                     organism = Homo sapiens
SEQUENCE: 84
MAEDDPYLGR PEQMFHLDPS LTHTIFNPEV FQPQMALPTD GPYLQILEQP KQRGFRFRYV   60
CEGPSHGGLP GASSEKNKKS YPQVKICNYV GPAKVIVQLV TNGKNIHLHA HSLVGKHCED  120
GICTVTAGPK DMVVGFANLG ILHVTKKKVF ETLEARMTEA CIRGYNPGLL VHPDLAYLQA  180
EGGGDRQLGD REKELIRQAA LQQTKEMDLS VVRLMFTAFL PDSTGSFTRR LEPVVSDAIY  240
DSKAPNASNL KIVRMDRTAG CVTGGEEIYL LCDKVQKDDI QIRFYEEEEN GGVWEGFGDF  300
SPTDVHRQFA IVFKTPKYKD INITKPASVF VQLRRKSDLE TSEPKPFLYY PEIKDKEEVQ  360
RKRQKLMPNF SDSFGGGSGA GAGGGGMFGS GGGGGGTGST GPGYSFPHYG FPTYGGITFH  420
PGTTKSNAGM KHGTMDTESK KDPEGCDKSD DKNTVNLFGK VIETTEQDQE PSEATVGNGE  480
VTLTYATGTK EESAGVQDNL FLEKAMQLAK RHANALFDYA VTGDVKMLLA VQRHLTAVQD  540
ENGDSVLHLA IIHLHSQLVR DLLEVTSGLI SDDIINMRND LYQTPLHLAV ITKQEDVVED  600
LLRAGADLSL LDRLGNSVLH LAAKEGHDKV LSILLKHKKA ALLLDHPNGD GLNAIHLAMM  660
SNSLPCLLLL VAAGADVNAQ EQKSGRTALH LAVEHDNISL AGCLLLEGDA HVDSTTYDGT  720
TPLHIAAGRG STRLAALLKA AGADPLVENF EPLYDLDDSW ENAGEDEGVV PGTTPLDMAT  780
SWQVFDILNG KPYEPEFTSD DLLAQGDMKQ LAEDVKLQLY KLLEIPDPDK NWATLAQKLG  840
LGILNNAFRL SPAPSKTLMD NYEVSGGTVR ELVEALRQMG YTEAIEVIQA ASSPVKTTSQ  900
AHSLPLSPAS TRQQIDELRD SDSVCDSGVE TSFRKLSFTE SLTSGASLLT LNKMPHDYGQ  960
EGPLEGKI                                                          968
```

The invention claimed is:

1. An exosome comprising
CD9,
a target peptide inserted between amino acids corresponding to amino acid positions 167 and 181 from the N-terminus of SEQ ID NO: 3, and
one or more active substance(s).

2. The exosome of claim 1, wherein said CD9 comprises the amino acid sequence of SEQ ID NO: 3.

3. The exosome of claim 1, wherein said CD9 consists of the amino acid sequence of SEQ ID NO: 3.

4. The exosome of claim 1, wherein the target peptide is inserted between amino acids corresponding to amino acid positions 170 and 171 from the N-terminus of SEQ ID NO: 3, and the target peptide is configured to transfer the exosome to a target tissue.

5. The exosome of claim 4, wherein the target tissue comprises at least one selected from the group consisting of blood brain barrier, inflamed blood vessels, striated muscle, liver, and cancer tissue.

6. The exosome of claim 1, wherein the target peptide comprises at least one selected from the group consisting of angiopep-2, ApoB, ApoE, VCAM-1 (vascular cell adhesion molecule-1) internalization sequence peptide complex, striated muscle target peptide, Peptide-22, THR, THR retroenantio, CRT, Leptin30, RVG (Rabies Virus Glycoprotein) 29, CDX, Apamin, MiniAp-4, GSH, G23, g7, TGN, TAT (45-57), SynB1, Diketopiperazines, and PhPro.

7. The exosome of claim 1, wherein the target peptide does not affect expression or function of the CD9.

8. A pharmaceutical composition comprising the exosome of claim 1.

9. A method of producing the exosome of claim 1, comprising:
a) preparing an expression vector by inserting the target peptide between amino acids corresponding to amino acid positions 167 and 181 from the N-terminus of the CD9;
b) introducing the expression vector of the step a) into an exosome-producing cell; and
c) producing the exosome, wherein the target peptide is expressed on the surface of the exosome.

10. The method of claim 9, wherein said CD9 comprises an amino acid sequence of SEQ ID NO: 3.

11. The method of claim 9, wherein the target peptide is inserted between amino acid positions 167 and 181 from the N-terminus of the CD9.

12. The method of claim 9, wherein the target peptide is inserted between the amino acids corresponding to amino acid position 170 and 171 from the N-terminus of SEQ ID NO: 3, and the target peptide is configured to transfer the exosome to a target tissue.

13. The method of claim 9, wherein the exosome-producing cell comprises at least one selected from the group consisting of B-lymphocytes, T-lymphocytes, dendritic cells, macrophage cells, macrophages, stem cells, HEK293T cells, and tumor cells.

14. The exosome of claim 1, wherein said one or more active substance(s) comprise a substance that enhances or inhibits a biological function.

15. The exosome of claim 1, wherein said one or more active substance(s) comprise at least one selected from the group consisting of a protein, an enzyme, a nucleic acid and a chemical.

16. A pharmaceutical composition comprising;
    an exosome comprising a target peptide inserted between amino acids corresponding to amino acid positions 167 and 181 from the N-terminus of SEQ ID NO: 3; and,
    one or more active substance(s).

17. The pharmaceutical composition of claim 16, wherein the target peptide is inserted between amino acids corresponding to amino acid positions 170 and 171 from the N-terminus of the SEQ ID NO: 3 and the target peptide is configured to transfer the exosome to a target tissue.

18. The exosome of claim 16, wherein said one or more active substance(s) comprise a substance that enhances or inhibits a biological function.

19. The exosome of claim 16, wherein said one or more active substance(s) comprise at least one selected from the group consisting of a protein, an enzyme, a nucleic acid and a chemical.

20. A method for delivering one or more active substance(s), the method comprising delivering the exosome of claim 1.

* * * * *